US009861882B2

(12) United States Patent
Yim et al.

(10) Patent No.: US 9,861,882 B2
(45) Date of Patent: *Jan. 9, 2018

(54) AUGMENTED REALITY GAMING SYSTEMS AND METHODS

(71) Applicant: Trigger Global Inc., Los Angeles, CA (US)

(72) Inventors: Jason Yim, Los Angeles, CA (US); Mikayel Saryan, Playa Vista, CA (US)

(73) Assignee: TRIGGER GLOBAL INC., Los Angeles, CA (US)

( * ) Notice: Subject to any disclaimer, the term of this patent is extended or adjusted under 35 U.S.C. 154(b) by 398 days.

This patent is subject to a terminal disclaimer.

(21) Appl. No.: 14/478,901

(22) Filed: Sep. 5, 2014

(65) Prior Publication Data
US 2016/0067604 A1   Mar. 10, 2016

(51) Int. Cl.
*A63F 9/24*   (2006.01)
*A63F 13/00*   (2014.01)
(Continued)

(52) U.S. Cl.
CPC ...... *A63F 3/00697* (2013.01); *A63F 3/00643* (2013.01); *A63F 13/23* (2014.09); *A63F 13/235* (2014.09); *A63F 13/25* (2014.09); *A63F 13/40* (2014.09); *A63F 13/44* (2014.09); *A63F 13/53* (2014.09); *A63F 13/537* (2014.09); *A63F 13/5375* (2014.09); *A63F 13/5378* (2014.09); *A63F 13/57* (2014.09); *A63F 13/65* (2014.09);
(Continued)

(58) Field of Classification Search
USPC .................. 463/1, 5, 10, 20, 22, 31, 39, 40
See application file for complete search history.

(56) References Cited

U.S. PATENT DOCUMENTS

| 2003/0032484 A1 | 2/2003 | Ohshima et al. |
| 2006/0105838 A1* | 5/2006 | Mullen ............... A63F 13/00 463/31 |

(Continued)

FOREIGN PATENT DOCUMENTS

WO    WO 2014018226    1/2014

OTHER PUBLICATIONS

International Search Report to corresponding International Application No. PCT/US2015/048527, dated Jan. 26, 2016.

*Primary Examiner* — Adetokunbo O Torimiro
(74) *Attorney, Agent, or Firm* — James J. DeCarlo; Greenberg Traurig, LLP

(57) ABSTRACT

An augmented reality (AR) game system is disclosed wherein real-world objects are transformed into AR terrain elements and AR events generate real-world impact. The game environment is set up using real-world objects that include everyday objects and game pieces on a field of play. When viewed on the screen of a computing device executing the modules of the game system, the everyday objects are transformed into elements of an AR terrain while the game pieces can be augmented with various controls. Multiple viewing modes, for example, a third person view, a first person view or "POV" view from a selected game piece or a split screen view are contemplated for viewing the field of play. A subset of the augmented controls can be activated by the user to execute AR events some of which can have real-world impact. The AR events are executed based on game rules.

24 Claims, 17 Drawing Sheets

(51) Int. Cl.
*G06F 17/00* (2006.01)
*G06F 19/00* (2011.01)
*A63F 3/00* (2006.01)
*A63F 13/40* (2014.01)
*A63F 13/235* (2014.01)
*A63F 13/53* (2014.01)
*A63F 13/23* (2014.01)
*A63F 13/25* (2014.01)
*A63F 13/44* (2014.01)
*A63F 13/5375* (2014.01)
*A63F 13/5378* (2014.01)
*A63F 13/57* (2014.01)
*A63F 13/65* (2014.01)
*A63F 13/95* (2014.01)
*G06F 3/048* (2013.01)
*A63F 13/655* (2014.01)
*A63F 13/537* (2014.01)

(52) U.S. Cl.
CPC ............ *A63F 13/655* (2014.09); *A63F 13/95* (2014.09); *G06F 3/048* (2013.01); *A63F 2009/2482* (2013.01); *A63F 2009/2486* (2013.01); *A63F 2009/2488* (2013.01); *A63F 2300/308* (2013.01)

(56) References Cited

U.S. PATENT DOCUMENTS

| | | | |
|---|---|---|---|
| 2010/0304640 A1 | 12/2010 | Sofman et al. | |
| 2010/0331083 A1 | 12/2010 | Maharbiz et al. | |
| 2011/0065496 A1* | 3/2011 | Gagner | G07F 17/3209 463/25 |
| 2012/0049453 A1* | 3/2012 | Morichau-Beauchant | A63F 3/00214 273/236 |
| 2012/0052934 A1 | 3/2012 | Maharbiz et al. | |
| 2012/0083325 A1 | 4/2012 | Heatherly | |
| 2012/0162254 A1 | 6/2012 | Anderson et al. | |
| 2013/0259150 A1* | 10/2013 | Ruland | A63F 5/00 375/267 |
| 2013/0267309 A1* | 10/2013 | Robbins | A63F 3/00643 463/31 |
| 2014/0002444 A1 | 1/2014 | Bennett et al. | |
| 2014/0028712 A1 | 1/2014 | Keating et al. | |
| 2014/0028714 A1 | 1/2014 | Keating et al. | |
| 2014/0121015 A1 | 5/2014 | Massing et al. | |

* cited by examiner

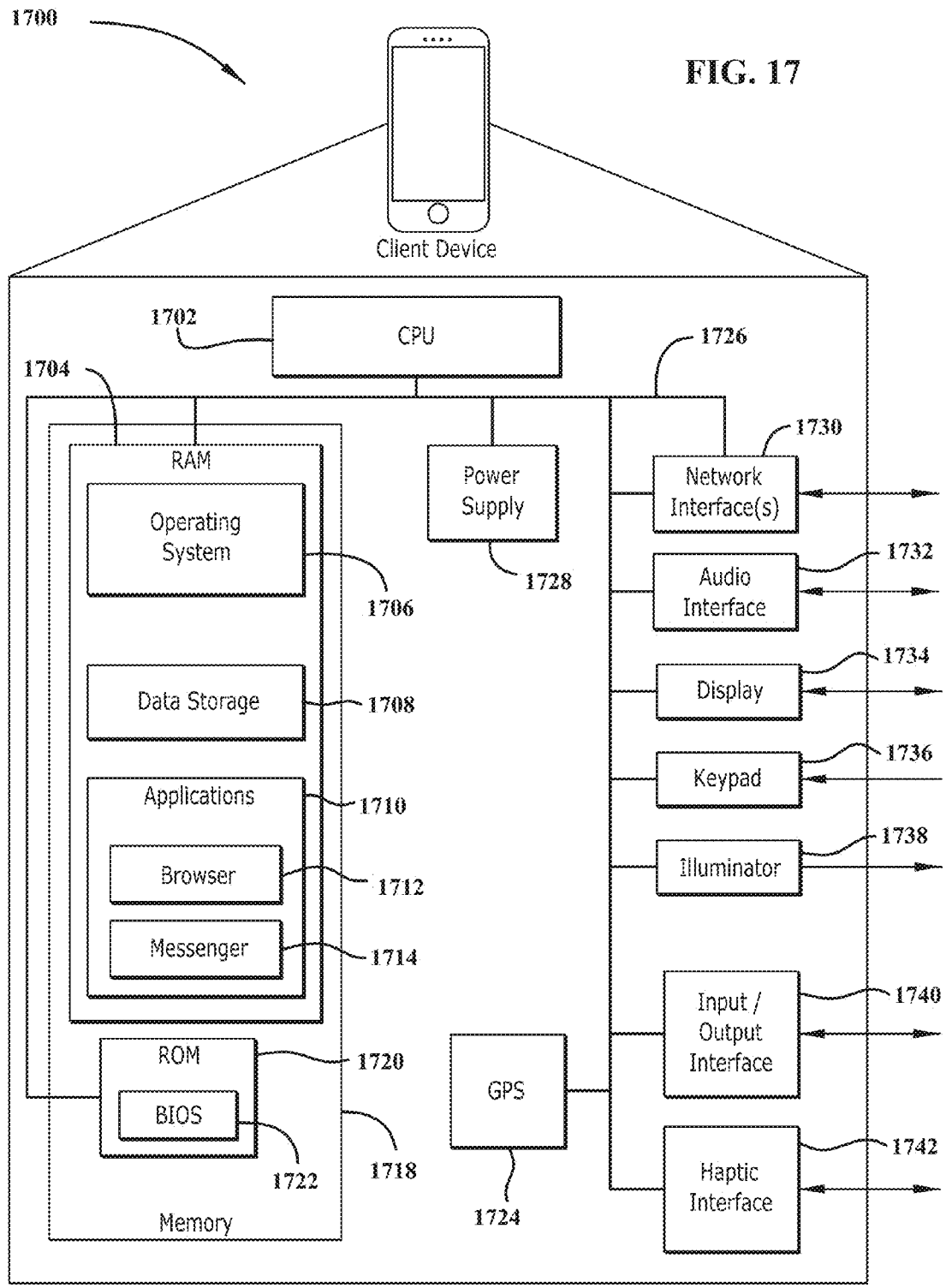

AUGMENTED REALITY GAMING SYSTEMS AND METHODS

BACKGROUND

Toys can provide both entertainment and education to children. Various toys that include dolls and action figurines made of wood, stone and clay were used since Roman and Egyptian times. Painted dolls and soldiers evolved in the 18$^{th}$ century which led to the development of modern day "photo-realistic" plastic figurines. Many hobbyists even collect figurines associated with particular characters or themes such as G.I. Joe. While stand-alone figurines allow children to use their imagination to make up their own games, figurines can also form part of more structured play like, board games and war games that involve strategy. Many board games however, have complex rules which demand great concentration and memory from the players.

SUMMARY

Different embodiments disclosed herein relate to systems and methods that facilitate augmented reality gaming for players. Embodiments permit a player to interact with game pieces and real world objects, that when viewed through a computing device configured for game play, appear visually different. The computing device, among other functions, scans the field of play, determines game rules are being followed, and can send and receive signals to and from game pieces, and/or implement user entered instructions, to control the appearance, behavior, position, motion, capabilities and/or physical integrity of game pieces and other real world objects in the field of play.

A method of implementing an AR game system is disclosed in one embodiment. The method comprises identifying, by a processor of a computing device, a field of play that includes a plurality of physical objects. Physical game pieces are differentiated from other field of play objects in the plurality of physical objects placed within the field of play. The field of play is displayed by the processor as a terrain for an AR (Augmented Reality) game on a display screen. Each of the field of play objects is displayed with a virtual appearance that differs from its appearance in the real world. The placements of the plurality of physical objects within the field of play are checked to determine if they comport with game rules. If they do not comport with the game rules, the processor provides feedback to a user of the computing device so that the placements can be adjusted to comport with the game rules. When the processor determines that the placement of the plurality of physical objects comport with the game rules, it signals the user that the AR game may be commenced.

In some embodiments, an image of at least one of the physical game pieces shown on the display screen is augmented with at least one additional virtual control that can be activated by a user input. In some embodiments, the activation of the additional virtual control causes a physical change to the at least one physical game piece. In some embodiments, activation of the virtual control causes a change in another game piece. In some embodiments, the processor can be configured to execute a graphic animation upon the activation of the virtual control in addition to causing a physical change to the other game piece. The other physical game piece(s) can be located in physical proximity to the at least one physical game piece or in a geographic location that is remote from the location of at least one physical game piece. Thus players of the game need not be co-located.

In some embodiments, at least one of the physical objects placed in the field of play is an unknown object and the processor is configured to display the unknown object as an element of the terrain in the AR game. If the unknown object does not comport with the game rules, the processor instructs the user to replace the unknown object. Moreover, the image of is not augmented or remains unchanged if the unknown object does not comport with the game rules.

In some embodiments, the physical game pieces are known to the processor via respective identifiers and when a new game piece is added to the field of play, a signal is received from the new game piece for registering its identifier with the processor. Upon registration, the processor displays an augmented image of the new game piece within the terrain of the AR game.

In some embodiments, a plurality of options related to the AR game are provided by the processor for user selection. When the user selection of one of the plurality of options is received by the processor, it overlays the terrain associated with the user selected option on the field of play.

In some embodiments, a user selection of one of the physical game pieces is received by the processor for generation of a point of view display and the point of view display of the terrain presenting positions of the physical game pieces in the field of play based on a perspective of the selected physical game piece is generated and displayed on a screen of the computing device.

In some embodiments, the processor further transmits a signal to affect an attribute of one or more of an element in the virtual environment or one or more of the physical game pieces at a predetermined time point(s) in the AR game. In some embodiments, the time point can be determined relative to the progress of the game or based on time elapsed since the occurrence of particular events or calculated based on one or more of the foregoing. In some embodiments, the affected attributes can be one or more of the physical or virtual attributes (by way of non-limiting example the deterioration of a playing field as a result of virtual rain or snow or the repeated passage of game pieces). For each attribute that is affected, the extent to which it is affected can be calculated in some embodiments. For example, if the attribute is affected in response to a game event, the extent to which the attribute is affected can depend on the intensity of the event. Thus, the extent of change in an attribute can be calculated based on the characteristics of the event that caused the change. In an embodiment, the signal is transmitted without user input.

An apparatus comprising at least one processor and a storage medium for tangibly storing thereon program logic for execution by the processor is disclosed in one embodiment. The program logic executed by the processor comprises, field identifying logic for identifying a field of play for placement of a plurality of physical objects and game piece identifying logic for identifying physical game pieces among the plurality of physical objects placed within the field of play so as to differentiate between the game pieces and the field of play objects. Displaying logic is executed by the processor, for visibly displaying on a display screen of the apparatus, the field of play as a terrain for an AR (Augmented Reality) game, wherein each of the field of play objects is displayed with a virtual appearance that differs from an appearance of the field of play object in the real world. The processor executes determining for determining if placements of the plurality of physical objects comport with game rules. Feedback logic, is executed by the processor, for providing feedback to a user of the apparatus if the placements or attempted actions or moves do not comport with the game rules and if the placement of the plurality of physical objects comport with the game rules, signaling logic is executed by the processor, for signaling to the user that the AR game may be commenced.

In some embodiments, feedback logic can also provide feedback to the users regarding the moves they execute in a game. For example, at a given turn during the game, the feedback logic can provide feedback regarding the moves the user can make from the current position or the capabilities of the game piece the user selected to make the move. In some embodiments, the feedback logic can provide information to a user regarding the capabilities of a selected game piece. In some embodiments, the feedback logic can provide information to the user regarding the special rules associated with particular game instances, events or other game entities as will be detailed further herein.

In some embodiments, augmenting logic is executed by the processor, for augmenting an image of at least one of the physical game pieces shown on the display screen with at least one additional virtual control. The processor also executes input receiving logic for receiving user input to activate the additional virtual control, wherein the activation of the additional virtual control causes a physical change to the at least one physical game piece, animation logic, for displaying a graphic animation upon the activation of the additional virtual control and change logic for causing a physical change to another one of the physical game pieces. At least one of the physical objects can be placed in the field of play is an unknown object. Furthermore, the processor executes logic for displaying the unknown object as an element of the terrain in the AR game. If the unknown object does not comport with the game rules, the processor executes instructing logic for instructing the user to replace the unknown object. In some embodiments, the processor executes new game piece logic for receiving a signal from an new game piece for identification and inclusion within the field of play, game options providing logic, for providing a plurality of options related to the AR game for user selection, option receiving logic for receiving the user selection of one of the plurality of options and overlaying logic for overlaying the terrain associated with the user selected option on the field of play.

In some embodiments, a point of view display of the terrain presenting positions of the physical game pieces in the field of play based on a perspective of a selected physical game piece and for displaying the point of view display on a screen of the computing device is generated by point-of-view display generating logic executed by the processor. The processor also executes logic for transmitting a signal to affect an attribute of at least one of the physical game pieces at a predetermined time point in the AR game.

A non-transitory computer readable storage medium, comprising instructions for implementing an AR game system is disclosed in one embodiment. The computer readable medium comprises instructions that cause the processor to identify a field of play for placement of a plurality of physical objects placed within the field of play so as to differentiate between the game pieces and the field of play objects. The instructions further cause the processor to visibly display on a display screen of a computing device, the field of play as a terrain for an AR (Augmented Reality) game, wherein each of the field of play objects is displayed with a virtual appearance that differs from an appearance of the field of play object in the real world and determine if placements of the plurality of physical objects comport with game rules and provide feedback to a user of the computing device if the placements do not comport with the game rules. If the processor senses that the placement of the plurality of physical objects comport with the game rules, it signals to the user that the AR game may be commenced.

In some embodiments, the computer readable storage medium also comprise instructions that cause the processor to augment an image of at least one of the physical game pieces shown on the display screen with at least one additional virtual control and receive user input to activate the additional virtual control. In some embodiments, the computer readable storage medium further comprises instructions, that cause the processor to display a graphic animation upon the activation of the additional virtual control and transmit a signal for causing a physical change to at least one of the game pieces. Further instructions are comprised with the storage medium for the processor to display an unknown object in the field of play as an element of the terrain in the AR game.

A toy figurine comprising a processor, a processor readable memory, a transceiver for transmitting and receiving signals from an external computing device and a main body comprising a plurality of parts is disclosed in some embodiments. At least one of the parts is configured to be responsive to the processor and configured for physical separation from the main body based on a separation instruction from the processor that is initiated by a signal from the computing device. The at least one part configured for the physical separation further comprises spring loaded components in an embodiment. In some embodiments, the plurality of parts further comprise actuating components for physically moving the toy figurine from a first position to a second position in response to receiving an actuating signal from the processor.

In some embodiments, the processor readable memory comprises a code for unique identification of the toy figurine by the external computing device. In some embodiments, the toy figurine further comprises a sensor for sensing presence of an object within a predetermined radius, audio components for generating sounds based on audio signals from the processor. In some embodiments the toy figurine is painted to support 3D object recognition.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views:

FIG. 17 is a schematic diagram illustrating a client device implementation of a computing device in accordance with embodiments of the present disclosure.

DESCRIPTION OF EMBODIMENTS

Figure 1:
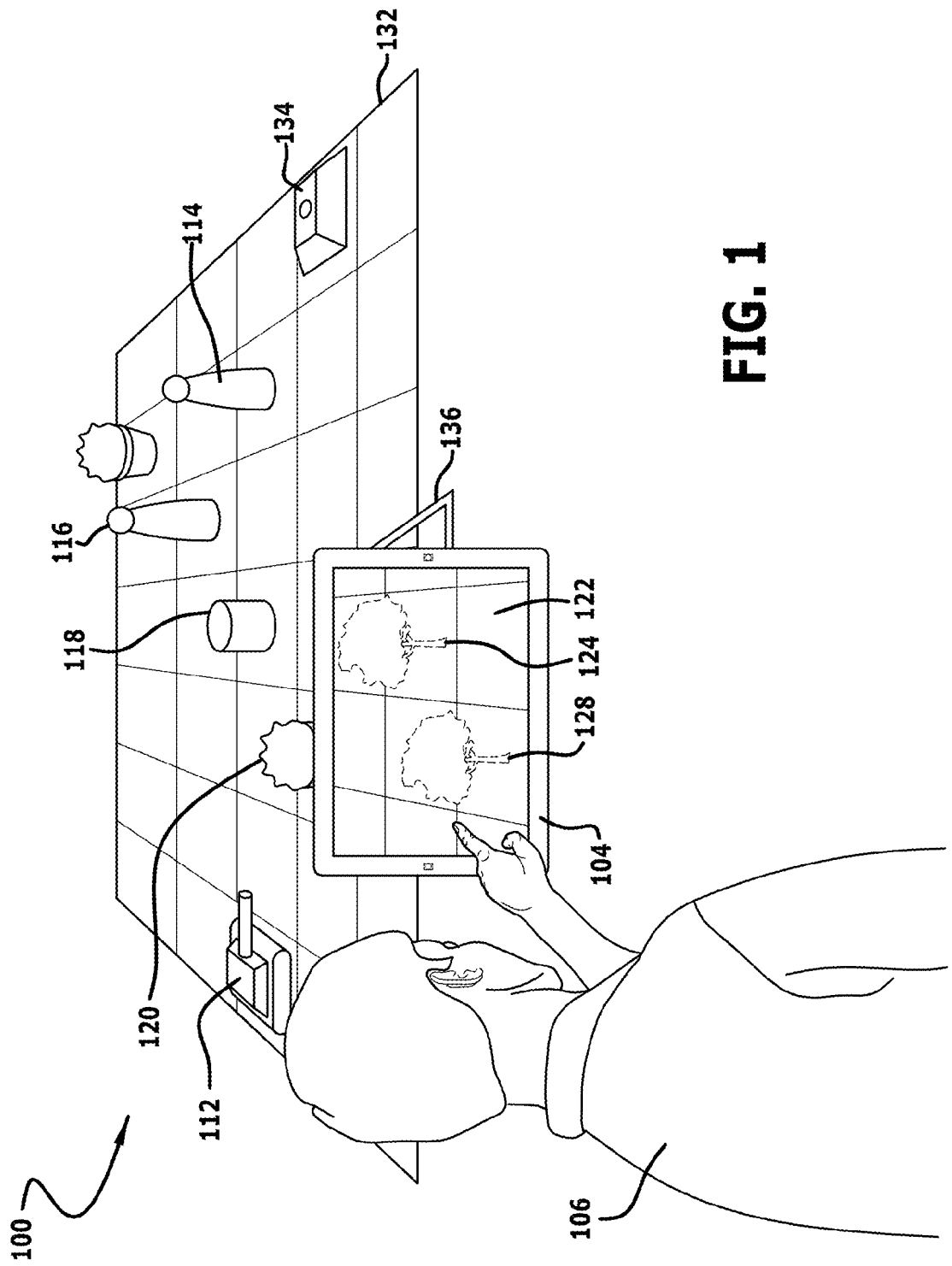
FIG. 1 illustrates an augmented reality game system in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments of the disclosed subject matter are described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network (or collection of devices) that may couple devices so that communications may be exchanged, such as peer-to-peer communications, or those between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, RFID, or the like. A wireless network may include virtually any type of wireless communication mechanism by which signals may be communicated between devices, such as a client device or a computing device, between or within a network, or the like A communication link may include wired or wireless links now known or to become known, for example, radio, infrared, laser, analog telephone lines, such as a twisted wire pair, a coaxial cable, full or fractional digital lines including T1, T2, T3, or 4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a wired or wireless link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Rapid developments in technology have led to the use of computing devices not only for business and scientific purposes but also for the entertainment purposes. Computerized games with complex rules have gained immense popularity. As a result, the video gaming industry has evolved into a multi-billion dollar industry where different games have their communities of devoted fans. As the graphics processing capacity of the microprocessors and data transmission capacities of communication networks improved, more complex games with realistic images were developed and transmitted to users with nearly zero latency. This allowed players across the globe to match their skills against each other for greater enjoyment. However, video games to date have been confined to the virtual world and have not been very successful in interfacing between the virtual worlds and the real world.

Embodiments disclosed herein close the gap between the virtual world(s) and the real world in the gaming environment such that events that occur in the virtual world have real world impact and vice-versa. More particularly, augmented reality gaming systems and method are discussed wherein augmented images of real-world objects, such as figurines, vehicles or landscape elements are presented to players as game pieces and terrain objects within a field of play on the display screen of a computing device. Particular actions executed by the players in the field of play, manually or via the computing device, are interpreted and where appropriate augmented thereby providing a virtual interface for real-world interactions. In particular embodiments, the players can affect figurines regardless of whether the figurines are located in proximity or remotely from them. In fact, some embodiments relate to transforming mundane real-world objects into exciting elements in the virtual world landscape. Moreover, various graphical user interfaces (GUIs) are provided which are able to lead the players during the games and thereby mitigating the need for players to learn or refer to complex rules that are the norm in the realm of video games.

Turning now to the figures, FIG. 1 illustrates an augmented reality game system 100 in accordance with some embodiments. The gaming system 100 comprises an area 102 designated as the field of play by a computing device 104. In some embodiments, a user 106 selects the field of play 102 to set up a plurality of physical objects such as 112, 114, 116 and 118. The plurality of physical objects can include certain designated game pieces 112, 114 and 116 and some AR game environmental elements or field of play objects 118, 120 (interchangeably referred to herein as terrain or landscape elements). In some embodiments the designated game pieces 112, 114 and 116 can be motorized toy figurines or vehicles (interchangeably referred to herein as game pieces) comprising various active and/or passive components. The toy figurines 112, 114 and 116 can be components sold as part of a base set of the AR game system 100, or can be obtainable separately. The game pieces can be configured to be uniquely recognizable by the computing device 104 via shape or image recognition, or via identifying elements embodied in the game pieces that communicate with the computing device and each other via communication protocols such as but not limited to Bluetooth, IR (Infra-Red), RFID (Radio Frequency Identification) and the like. In addition, the toy figurines 112, 114 and 116 can be further configured for physical changes in response to signals from the computing device 104 that may be transmitted via the aforementioned communication protocols.

In some embodiments, the elements of an AR game environment or field of play objects 118, 120 can be toy trees or mountains sold with the AR gaming system 100. In some embodiments, the elements of an AR game environment 118, 120 can be real world objects which have no particular relevance to the AR game environment such as, a can 118 or a candy packet 120 or similar objects such as overturned cups, scraps of cloth or ribbon, wood blocks, and the like. In some embodiments, the computing device 104 can scan such objects, calculate their general size and shape and apply augmented characteristics to the objects in the field of play in a contextually relevant way (and in accordance with game rules), to augment such objects when viewed via the computing device 104. In such a way, an overturned cup becomes a hill, the cloth a dirt mound, and the ribbon a stream, as non-limiting examples.

During play, when viewed on the display 122 of the computing device 104, the appearance of these real world objects 118, 120 is transformed so that they do not appear in their actual form but appear as, for example, trees 124, 128 in the AR gaming environment. It may be appreciated that example real world objects 118, 120 and their transformations are only discussed herein for illustration and not limitation. Any real world object that comports with the game rules can be used and its appearance on the display 122 is transformed to suit the AR environment, again in accordance with the game rules. Further details regarding such transformation are discussed infra.

When the placement of the physical objects 112, 114, 116, 118 and 120 is completed to the user's 106 satisfaction, the user 106 can turn on the computing device 104 and focus the computing device 104 on the field of play 102. It may be appreciated that although the computing device 104 is shown to be a tablet device, this is just a suggested embodiment. Other mobile or stationary computing devices such as but not limited to smartphones, laptops, desktops, tablets, game consoles, handheld electronic devices or streaming devices may be used to execute the game. In an embodiment, the camera or other element capable of scanning a physical space (not shown) of the computing device 104 is aimed or focused onto the field of play 102 so that a view of all or parts of the field of play 102 are shown on the display screen 122 of the computing device 104. A software application or an 'app' which comprises a series of instructions executable by a processor (not shown) of the computing device 104 is activated by the user 106 in order to begin the AR game. In some embodiments, the app provides the user 106 with a pre-selected, standard "terrain" for the field of play. In some embodiments, the app can present the user 106 with multiple options related to different games or different terrains. For example, options related to game themes based on real world scenes like snowy and mountainous terrain, tropical forests, deserts, marshes, urban environments or even fictitious settings like an alien planet can be presented for user selection. Based on the user selection of the game theme, a terrain is overlaid on the view showing the field of play 102 on the display screen 122.

Furthermore, based on the user selection of the game theme, a set of game rules can be automatically selected for implementation. For example, a game can have a one player version or a two player version. Embodiments based on processing power can comprise without limitation, a single human player game, a single human player playing against the computing device 104, multiple human players in physical proximity to each other such as in the same room sharing the field of play 102, or having separate fields of play, and multiple players who are geographically remote from each other, each having their own field of play or sharing a field of play through a virtual presentation at one or more players' device. Based on the user selected version, a set of game rules may be selected for implementation by the computing device 104. In some embodiments, further options relating to the games can be presented for user selection. Such presentation of options can be tied to the user's 106 sophistication levels in accordance with some embodiments.

Upon generating a view of the field of play 102, the computing device 104 detects the plurality of physical objects located in the field of play 102 so as to differentiate between the game pieces 112, 114, 116 and the field of play objects 118, 120. As described supra, the plurality of physical objects can include real world objects or field of play objects 118, 120 which form part of the AR terrain. In some embodiments, the appearance of the field of play objects 118 and 120 on the display screen 122 is altered, changed or augmented by the computing device 104 so that they form elements of the user-selected AR terrain. In some embodiments, any real world object whose size and shape comports with the game rules can be transformed into an environmental element as discussed herein.

For example, in the embodiment shown in FIG. 1, a forest-like terrain forms the game backdrop and the field of play objects 118 and 120 are augmented to be displayed like trees 124, 128 in the forest based on predetermined game rules. In some embodiments, the game can be configured to present options related to the augmentation of the field of play objects 118, 120 for user selection. For example, based on size and shape of the objects, the user 106 can select from various options such as but not limited to, large trees, shrubs, a small hill of rocks, mountain etc. In some embodiments the appearance a real world object is not altered or transformed in the display of the computing device if the real world object is too large or too small to form a part of the AR environment. In such instances, the user 106 may be instructed to remove or re-position the objects.

In addition to transforming the appearance of the field of play objects 118, 120, the computing device 104 further identifies game pieces 112, 114 and 116 based on their respective unique identifiers. It may be appreciated that the game pieces 112, 114 or 116 can be configured as any living/non-living entities which may or may not exist in the real world. In some embodiments, the processor may cause transmission of a signal from the computing device 104 to the game pieces 112, 114, 116 in order to obtain their identification indicia. Based on their identifying indicia, the computing device 104 can determine if the placement of the game pieces 112, 114 and 116 comports with the game rules. For example, if the user 106 has selected a single player war game version, then soldier figurines 114 and 116 may belong to two opposing groups based on the game rules. Therefore, the placement shown in FIG. 1 may be erroneous. In this case, the user 106 can be advised by the computing device 104 via a message on the display screen 122 or other tactile or audible event, to move one of the soldiers 114 or 116 to the opposite side of the field of play 102. If, on the other hand, the user 106 selected a two player version to play against another locally or remotely located player (not shown), the soldiers 114 and 116 may belong to the same group and hence the placement shown in FIG. 1 is in accordance with the game rules. When the computing device 104 determines that the placement of the plurality of physical objects 112, 114, 116, 118 and 120 comports with the game rules, it signals the user to start the AR game.

In some embodiments, the AR game can involve moving the physical objects 112, 114, 116, 118 and 120 by the user 106. In such instances, the new positions of any object that is moved can be automatically detected by the computing device 104 and the scene shown on the display screen 122 can be modified to show the new positions. In some embodiments, commencing the AR game can change the appearance of one or more game pieces 112, 114 or 116. For example, the appearance of game pieces such as the moveable vehicle 112, or soldiers 114, 116 can be augmented on the display screen 122 to show the perimeter of the area within which the vehicle 112 can properly move in accordance with game rules. In some embodiments, the view of the vehicle 112 can be further augmented with a point selection control (not shown), the selection of which control can cause the vehicle to move to the selected point.

Furthermore, the appearance of the moveable vehicle 112 or the soldiers 114, 116 can be changed or augmented with virtual body parts or weapons in accordance with one or more of the user selected options and game rules in some embodiments. In some embodiments, when the virtual weapon of, for example, the moveable vehicle 112 is activated, it can simulate on the display screen 122, a firing of a bullet or a missile or energy ray. When the missile or the bullet hits another soldier, for example, soldier 116, then a simulation of the scene is also generated and shown on the display screen 122. Such a display can be accompanied for example, by sound effects or tactile effects like vibration. In addition, a signal is sent to the soldier figurine 116 in order to detach one or more separable parts of the soldier figurine 116 from its main body. The separation of parts is not only simulated on the display screen 122 but also occurs in the real world. Therefore, when the user 106 moves away from the computing device 104, and looks at the soldier figurine 116 in the real world, he or she may find the separable parts detached from the main body of the soldier figurine 116 and lying on the floor. Thus, virtual effects can be translated to have real-world impact in accordance with some embodiments.

It may be appreciated that although the description herein involves a missile shooting from the moveable vehicle 112 to a solider 116 located in its vicinity, this is not necessary. While the display screen 122 can show a missile emerging from the moveable vehicle 112, its effect can be felt remotely. For example, if the user 106 is playing against another user located in the same room or remotely (not shown) in another city/country/continent, the effect of the shooting missile can be simulated not only on the display screen 122 of the computing device 104 but also on the display screen of the computing device of the other user. In addition, when the remote user moves away from his/her computing device and views the game piece in the real world, he or she will find some parts of the soldier figurine which was hit by the missile in the AR game would have fallen to the floor in the real world at the remote location. Thus, the real-world impact of the AR event is not confined to the geographic location at which the AR even occurs. Rather, if the AR event occurs at one location its effect in the real world can manifest at any location regardless of the geographic confines.

In some embodiments, a physical mat 132 is used to define the field of play 102. The user 106 initially lays out the mat 132 thereby defining the field of play 102 and places the real world objects 112, 114, 116, 118, 120 within the mat 132. In some embodiments, the mat 132 can also include a computing device 134 that facilitates controlling the game pieces 112, 114 and 116. The computing device 134 can include a processor, a processor readable memory and a transceiver. The transceiver facilitates the computing device 134 to exchange signals with the computing device 104. In some embodiments, the processor readable storage medium of the computing device 134 can store the game rules so that its processor can facilitate better control of the game pieces as it will be physically connected to the storage medium. This can enhance the effects of the game, for example, by reducing latency. In some embodiments, the mat 132 bears a distinctive pattern that enables the computing device 102 to accurately determine the position of the real world objects 112, 114, 116, 118, 120 within the field of play 102. For example, the mat 132 has a grid pattern. However, other patterns which may include but are not limited to shapes, alphabetical, numeric, or alphanumeric characters, images or trademarks or other visible or sensible indicia or element can be printed on the game surface mat 132 for position determination. In other embodiments the mat or game surface can have located in or on, or embedded therein, sensors that can detect the position, identity and/or capabilities of game elements deployed on the surface. For example an antenna or sensor array can be positioned in or on a game surface for receiving and sending signals to and from the game pieces and other game pieces or the computing device (s), or for detecting RFID tags deployed in game pieces, or embedded magnets in the game pieces. In the case of embedded magnets, in a further embodiment, moveable magnets can be positioned beneath the game surface that can be controlled by the computing device to capture and move pieces via magnetic attraction.

In some embodiments, a stand 136 can be used to hold the computing device 104 not only to prevent its displacement which in turn can disturb the scene on the display screen 122 but also to enhance user convenience during play. The stand 132 can be made of metal, plastic or other material and can have clamps or suction elements (not shown) to firmly hold the computing device 104. In addition, the clamps can be adjustable so that the user 106 can set them at a desired angle for viewing the field of play 102.

Embodiments of the AR game system 100 thus balance and seamlessly integrate the virtual and real worlds. They facilitate easy play as there is no "friction" or burdensome overhead from the technology. This is because the AR game system 100 involves simple "point and play" wherein the user 106 "looks" at the field of play 102 via a camera or other sensor of the computing device 104 followed by a drag and drop of commands on the display screen 122 or live movement of the game pieces, or combinations thereof. In some embodiments, the user interface shown on the display screen 122 can lead the user 106 by providing only relevant choice of commands during game play. The physical game pieces 112, 114 and 116 that are remotely controllable follow the commands received from the computing device 104. The games that can be used with the AR game system 100 further mimic the natural play patterns in a child's imagination via an intermingling of the real and virtual worlds.

Figure 2:
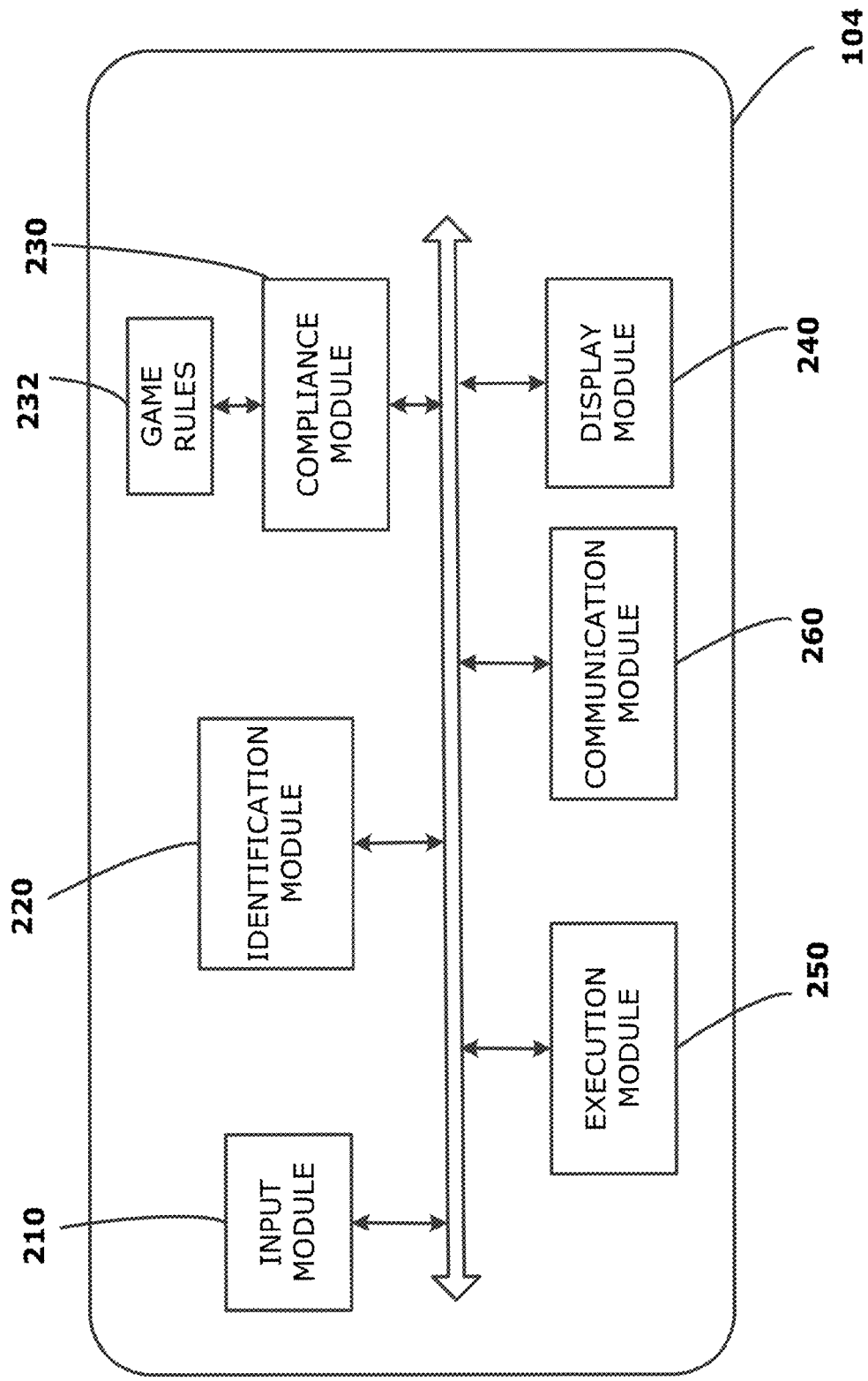
FIG. 2 shows a schematic diagram of the various intercommunicating modules of the AR game system executed by the computing device.

FIG. 2 shows a schematic diagram of the various intercommunicating modules of the AR game system 100 executed by the computing device 104. An input module 210 is configured to receive input from various components of the computing device 104. In some embodiments, the user 106 can convey a desire to begin an AR game by activating the input module 210. The input module 210 receives initial visual or sensed input from the camera or other sensor (not shown) of the computing device 104, alone or in combination with input from the game surface as discussed above. For example, the camera associated with the computing device 104 serves as an input device so that the computing device 104 can generate a virtual view of the field of play 102 which is shown on the display screen 122 by the display module 240. In embodiments the virtual view can be generated using input from the sensed input of the computing device and information from the game surface as to the location and identity of game pieces and field of play elements. In some embodiments, the field of play 102 further comprises the physical objects 112, 114, 116, 118 and 120 which are also shown on the display screen 122.

In some embodiments, the input module 210 further transmits the visual or sensed input from the camera and/or game surface to the compliance module 220 which analyzes the distribution of elements in the field of play and determines if the placement of the physical objects 112, 114, 116, 118 and 120 within the field of play 102 complies with the game rules 232. The physical object positions can be determined via various methodologies which comprise AR techniques such as 3D recognition by software such as VUFORIA™, use of 2D (two dimensional) markers on the objects, through RFID or via infrared reflection grid or RFID or magnetic detection when the mat 132 is used. In some embodiments, the compliance module 220 can include programming logic for delimiting the field of play 102 and for identifying the game pieces 112, 114 and 116 from the field of play objects 118 and 120. As discussed supra, in embodiments the game pieces 112, 114 and 116 are configured with unique ids which are received by the communication module 260. Any object not recognized as a game piece can be designated as a field of play object whose appearance is altered in accordance with the game rules 232. If the size/shape of the object is not conducive for its use as a field of play object the user 106 can be advised by the compliance module 220 to remove the object.

In some embodiments, the communication module 260 is configured for direct connection with the game pieces 112, 114 and 116 via Bluetooth, WiFi, infrared and the like. In some embodiments wherein the physical mat 132 with the computing device 134 is used, an indirect communication channel can be established between the game pieces 112, 114, 116 and the computing device 104 via the computing device 134 located on the mat 132. The game pieces 112, 114, 116 can be connected to the computing device 134 via wireless channels such as Infrared or RFID channels which in turn can be connected to the computing device 104 through Bluetooth, WiFi or similar channels, or wired. In order to be configured for multiplayer modes, the computing device 134 can comprise multiple Bluetooth chips or the mat 132 can comprise multiple computing devices that are similar to the device 134.

In some embodiments, the game rules 232 stored on the computing device 104 are programmatic routines that provide outputs based on the signals from the input module 210. As mentioned herein the game rules 232 are dynamically selected based on the user's 106 choice of the game. As the game rules 232 are embedded as part of the computing device 104, the user 106 no longer needs the thick rule books that used to govern the minutiae of game play. At each step, the game rules 232 operate to offer the user 106 only choices that are relevant for that step so that the user 106 is saved the effort or trouble of calculating all the different variables in a game simulation. In some embodiments, the game rules 232 can be selected based not only on the particular game selected by the user 106 but also on the various game options such as, single/multiplayer, proximate/remote opponent, level of difficulty and the like. For example, if the user 106 has chosen a multi-player game with a proximate opponent, the computing device 104 can select game rules 232 whereby the field of play 102 not only accommodates game pieces 112, 114 and 116 belonging to the user 106 but also accommodates the game pieces belonging to the opponent. On the other hand, if the user 106 has chosen a multiplayer game with remotely located opponent(s), the game rules 232 are selected that allow the user's 106 pieces to occupy the entire field of play 102, with the remote user's pieces appearing virtually on the display, and vice-versa for the remote user. Another possibility involves the user 106 selecting a single player version in which case the game pieces 112, 116 and 116 need to be distributed between two opposing groups. In this case, the game rules 232 can require the user 106 to identify the members of the opposing groups among the game pieces 112, 114 and 116.

In some embodiments, the display module 240 is configured to change the appearance of the real world objects 112, 114, 116, 118 and 120 when showing them within the AR environment on the display screen 122. Images of the field of play elements 118 and 120 can be varied by the display module 240 so that they appear as elements in the AR terrain in the virtual world based on the shape/size of the objects 118, 120 and game rules 232. By way of non-limiting example, if the user 106 has selected a forest as the game locale, the elements 118, 120 are transformed as trees by the display module 240 when shown on the display screen 122 in FIG. 1. Images of game pieces 112, 114 or 116 on the display screen 122 can be augmented by appearance and with additional virtual weapons or body parts. Activation of such virtual weapons by the user 106 can result in occurrence of AR events which can have real world impact. For example, a missile shot from a virtual weapon of the game piece 112 can cause a portion of another game piece 114 to be physically separated from its main body as will be detailed further herein.

Based on the selected game rules 232, the compliance module 220 determines if the placements of the real world objects 112, 114, 116, 118 and 120 within the field of play 102 complies with game rules 232. If the placements comply with the game rules 232 then the compliance module 220 can signal the user 106 to start the game, for example, via a pop up message on the display screen 122. As described supra, the appearance of one or more of the game pieces 112, 114, 116 and the field of play objects 118, 120 can be altered upon the commencement of the game. The field of play objects 118, 120 are altered to appear as AR terrain elements. The game pieces 112, 114 and 116 can be augmented with virtual controls which when activated by the user 106 enable execution of various actions in the virtual world. Such actions can have impact in the real world as detailed herein.

When the user 106 executes any action during game play, the input module 210 detects such user input and the compliance module 220 determines if such action comports with the game rules 232. For example, if the user 106 physically moves the game piece 116, the compliance module 220 determines if the new position of the game piece 116 is in compliance with the game rules 232. In case it does not comply with the game rules 232, feedback can be provided to the user 106 in accordance with the game rules 232. The feedback can include signaling the user 106 to move the game piece 116 or decrementing the user's score 106 and the like.

In an embodiment, if an action executed by the user's 106 opponent during game play complies with the game rules 232, the computing device 104 can receive a signal via the communication module 260 to execute certain actions. For example, if the opponent shoots a missile at the game piece 114, the communication module 260 can receive a signal which is communicated to the execution module 250. The execution module 250 can cause the computing device 104 to execute actions such as but not limited to simulating an explosion on the display screen 122 in proximity to the game piece 114, producing sound, tactile or other effects. Moreover, the communication module 260 can also transmit a separation instruction to the game piece 114. Upon receiving the separation instruction, the parts of the game piece 114 configured for physical separation are detached and fall away from its main body.

In an embodiment, the various modules detailed herein employ 3-dimensional object recognition technology such as VUFORIA™ can be employed for such image augmentation. VUFORIA™ is a software platform from QUALCOMM™ that uses computer vision-based image recognition that enables AR app experiences. SMART TERRAIN™ is a feature of the VUFORIA™ SDK (software development kit) that enables development of immersive augmented reality gaming experiences via augmenting the physical environment to create new kinds of gaming and visualization applications such as the AR game system 100 described herein.

Figure 3:
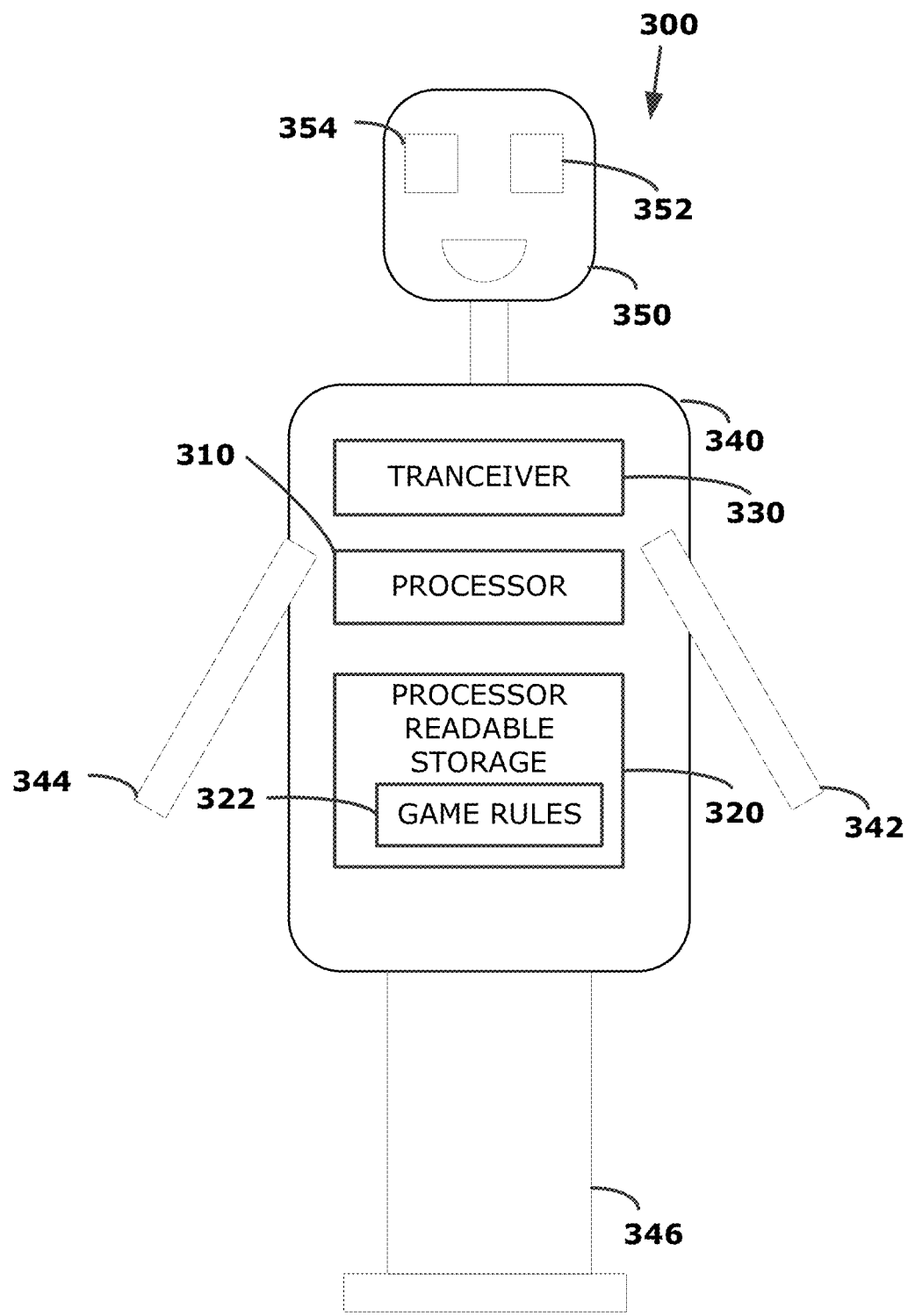
FIG. 3 is a schematic illustration of a toy figurine that can be used as a game piece in accordance with some embodiments.

FIG. 3 is a schematic illustration of a toy figurine 300 that can be used as a game piece in accordance with some embodiments. It may be appreciated that the shape/size of the toy figurine 300 is only shown for illustration purposes and that a toy figurine of any shape and size can be configured with elements as described herein. In other words it may be an entity, a vehicle, an aircraft or spaceship, an animal, an alien or any other game element that might be imagined. The toy figurine 300 comprises a main body 340 which includes a processor 310, a processor readable storage medium 320 and a transceiver 330 that enable control and communication of the toy figurine 300 with an external computing device 104. Again, the placement of the processor 310, the processor readable storage medium 320 and the transceiver 330 as shown in FIG. 3 is only by the way of illustration and that these elements can be placed anywhere within the toy figurine 300.

The main body 340 has a plurality of parts 342, 344 and 346 attached thereto. At least a subset of the parts 342, 344, 346 can be configured with controllable spring-loaded components or other controllable releasable securement devices such as magnets or clips or clamps for example, so as to cause remotely controllable separation from the main body 340 in response to receiving a separation instruction from the processor 310. At the end of the game (or when game rules permit), the user 106 can re-attach the parts to the main body 340 for future play. In some embodiments, the transceiver 330 can receive a signal from the computing device 104 regarding an AR event occurring in the virtual world. In response to receiving the signal from the computing device 104, the processor 310 can be configured to control the toy figurine 300 to be responsive to the AR event (for example an AR laser blast). In some embodiments, one or more of the parts 342, 344 and 346 can also be configured for actuation in response to an actuating instruction from the processor 310. This can enable the toy figurine 300 to move from one position to another in the real world. In some embodiments, the part 346 can be configured with a motorized base or surface to which different versions of the main bodies can be detachably coupled thereby facilitating creating different game pieces interchangeable among a single motorized base 346 and a plurality of different main bodies.

Embodiments can include the toy figurine 300 configured not only for physical movement or separation but also for moving parts 352, 354, 356 of a face 350 or other moveable parts 342, 344, 346. In some embodiments, emotions can be expressed via real or virtual augmentation of the figurine's 300 appearance on the display screen 122. In embodiments the game piece(s) can have their behavior altered as a result of game events or opponent moves (e.g. inflicted wounds, hunger, thirst, anger, exhaustion) or via user selection of a behavior or the passage of time in the game. In some embodiments, the toy figurine 300 can communicate via producing light from LEDs on its body 340 or face 350 or by producing a sound via one or more of activation of sound elements present within the figurine's 300 body 340 or via the speakers of the computing device 104 or another sound system (not shown) via a wired or wireless connection.

In some embodiments, certain portions of the game rules 322 can be stored in the processor readable storage medium 320. For example, if a muddy/marshy or snowy war game locale is selected by the user 106, the computing device 104 can initially store certain game rules 322 that affect the speed of the toy figurine 300 in the storage medium 320 initially and over time. Therefore, as the game progresses, the processor 310 can cause the toy figurine 300 to move more slowly as it slogs through increasing amounts of virtual mud as the game progresses and the virtual battlefield is "chewed up" by virtual game piece traversal. Similarly, game rules 322 can also include instructions to produce certain pre-recorded sounds via speakers which may be included in the toy figurine 300, or the sounds can be transmitted to remote speakers such as an audio surround system for a heightened sensory experience. In some embodiments, the toy figurine 300 can be painted with special visible or invisible (UV) paints or be fabricated from or incorporate materials that can sensed and used to enhance the appearance of the toy figurine 300 in the virtual world when viewed through the computing device 104.

Figure 4:
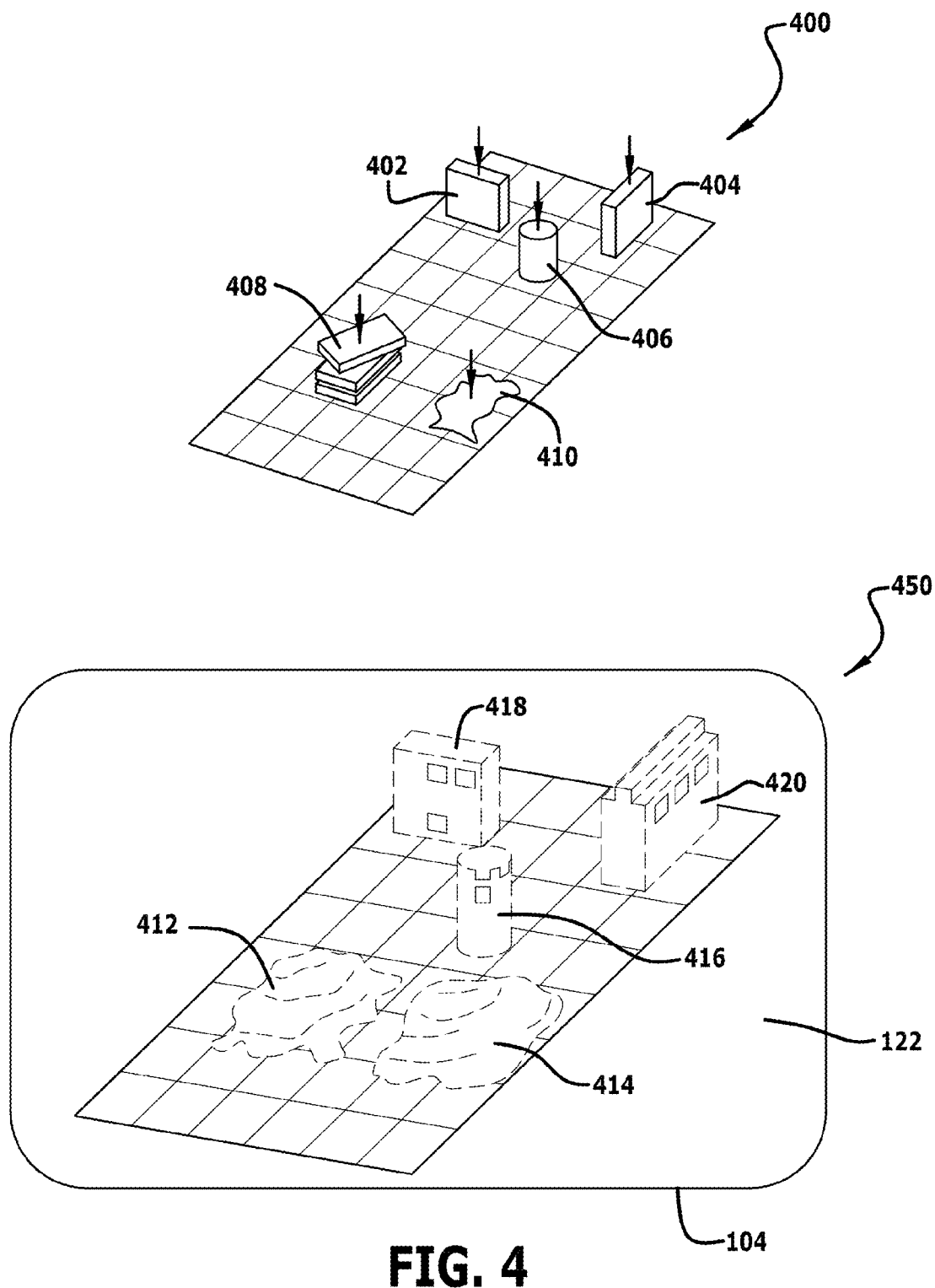
FIG. 4 is an illustration that depicts how a real world scene is transformed in the virtual world when viewed on the display screen of the computing device in accordance with some embodiments of the AR game system.

FIG. 4 is an illustration that depicts how a real world scene 400 is transformed in the virtual world 450 when viewed on the display screen 122 of the computing device 104 in accordance with some embodiments of the AR game system 100. A few randomly selected real-world objects can be transformed into elements of the AR terrain in the virtual world by modules of the AR game system 100 executing on the computing device 104. Regularly shaped objects such as boxes 402, 404, a can of soda 406 or irregularly shaped objects such as the books 408 heaped haphazardly together or a pile of cloth 410 can be transformed into respective AR terrain elements 412, 414, 416, 418 and 420 based on one or more of the game rules and user choices.

In some embodiments, the user's 106 choice of a game locale can cause the regularly shaped objects 402, 404, 406 to be transformed into buildings/ruins 416, 418, 420 and irregularly shaped objects to be transformed as hills or heaps of snow/sand or other organic terrain 412, 414. In some embodiments, the display module 240 can automatically determine/select the AR terrain elements into which the objects 402, 404, 406, 408 and 410 are to be transformed based, for example, on the game rules 232. In some embodiments, the user 106 can select from various options to transform the real world objects 402, 404, 406, 408 and 410 into AR terrain elements. The options that are possible for a given game locale or AR terrain can be provided to the user 106 by the game rules 232 based on the size and shape of the real world objects 402, 404, 406, 408 and 410.

Figure 5:
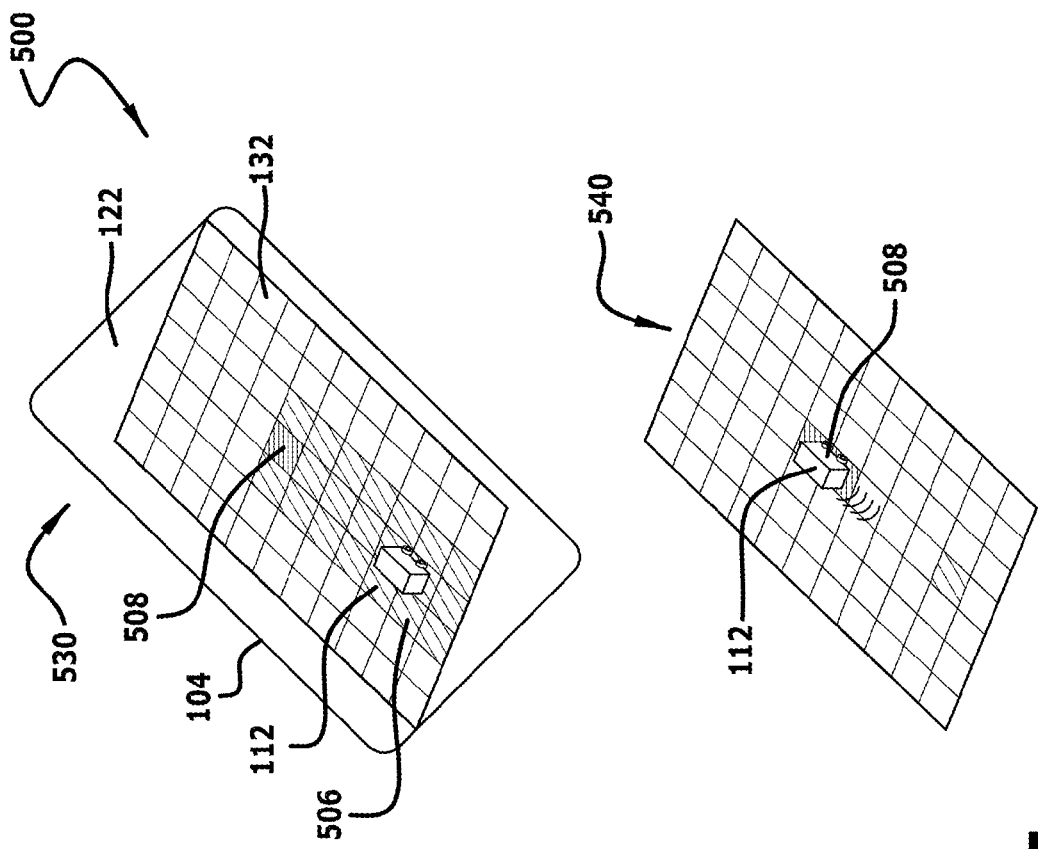
FIG. 5 is an illustration that shows various game pieces augmented with virtual controls in accordance with some embodiments.
Figure 5:
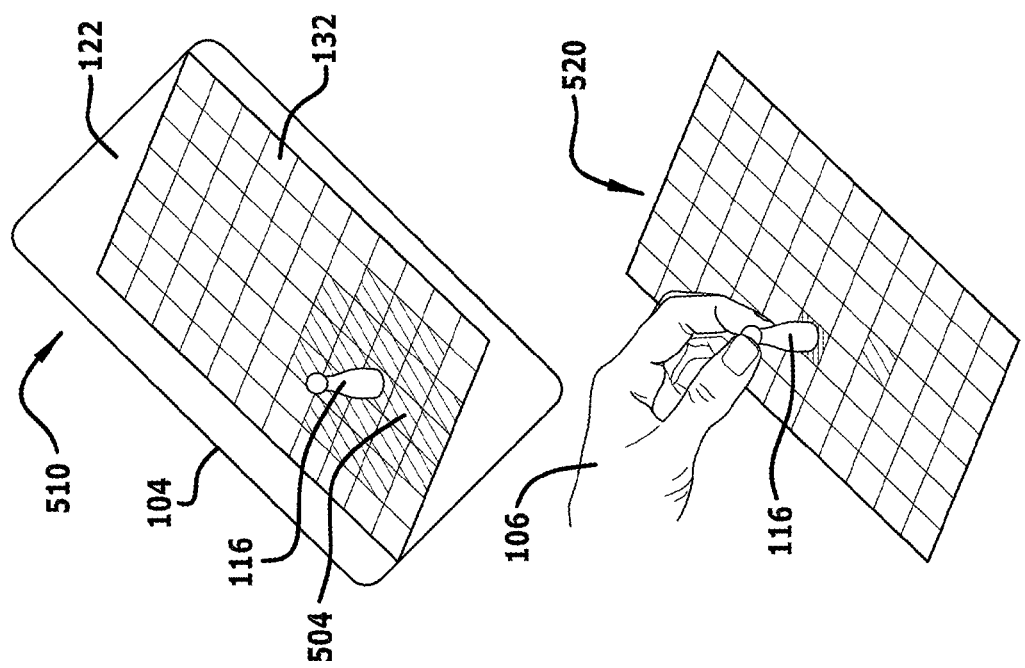

FIG. 5 is an illustration 500 that shows various game pieces augmented with virtual controls in accordance with some embodiments. An illustration of a game piece such as, the toy figurine of a soldier 116 augmented with a virtual control 502 is shown at 510. In this case, the game piece 116 is placed on the mat 132 and viewed through the display screen 122 of the computing device 104. The appearance of the game piece 116 is altered to include the virtual control 504 that shows targeting information or the moveable range in which the game piece 116 can be moved in accordance with the game rules 132. This can involve the computing device 104 to identify the game piece 116 and calculation of its allowed range per the game rules 232. For example, as the game progresses and the game piece 116 moves in snow/mud, the AR view shows the mud/snow sticking to game piece 112 and its moveable range can be reduced accordingly by the game rules 232. In some embodiments, the moveable range can be limited due to the presence of a field of play object or a virtual obstacle. At 520, the user 106 physically moves the game piece 116 in compliance with the game rules. If the game piece 116 lies outside the allowable range shown by 504 a message can be displayed to the user 106 on the display screen 122 to place the game piece 116 within the range set by the same rules 232.

Another illustration of a game piece such as the toy figurine 112 augmented by a virtual control 506 when viewed on the display screen 122 is shown at 530. The virtual control 506 is similar to the virtual control 504 in that it represents the moveable range within which the game piece 112 can be moved in accordance with the game rules 132. However, in this case, the virtual control 506 is operable to physically displace the game piece 112 in the real world. Such displacement is made possible via allowing the user 106 to select on the display screen 122 a point 508 indicative of the position to which the user 106 desires to move the game piece 112 within the moveable range 506. In response to the user selection of the point 508, the computing device 104 can activate the game piece 112 to move to the new position indicated by the point 508 in accordance with embodiments detailed further infra. The automatic displacement of the game piece 112 from its original position shown at 510 to its new position 508 is shown at 540. It can be appreciated that although a soldier figurine 116 is shown as being displaced by a user while a vehicle figurine 112 is shown as being automatically displace, this is not necessary. Any toy figurine having a motorized base 346 or other capability for controllable motion (e.g. a quad rotor or magnetic base as described above) can be displaced and relocated automatically in accordance with embodiments detailed herein as game rules permit.

Figure 6:
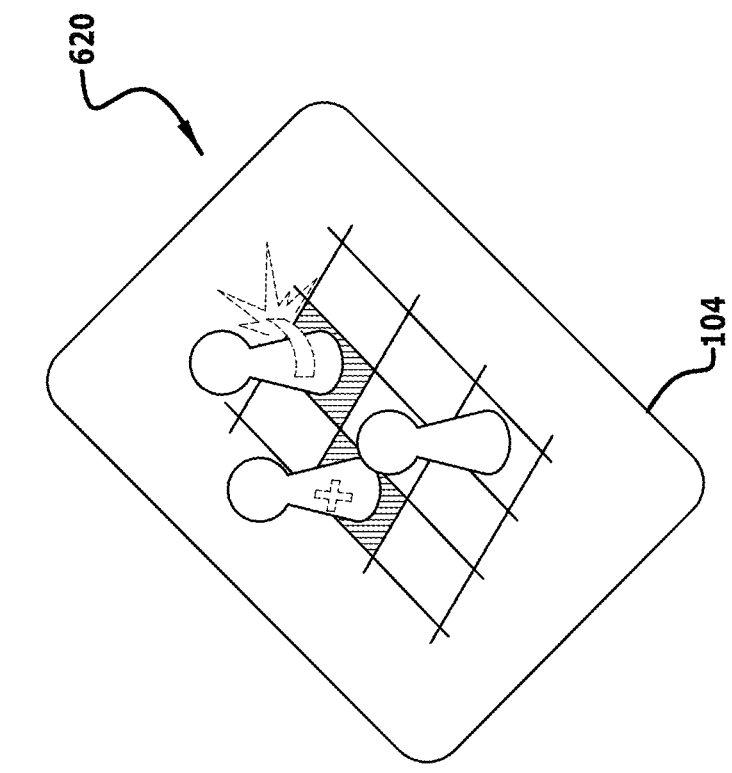
FIG. 6 shows an embodiment of the AR game system that illustrates auto-selection of game pieces and adding special abilities/actions.
Figure 6:
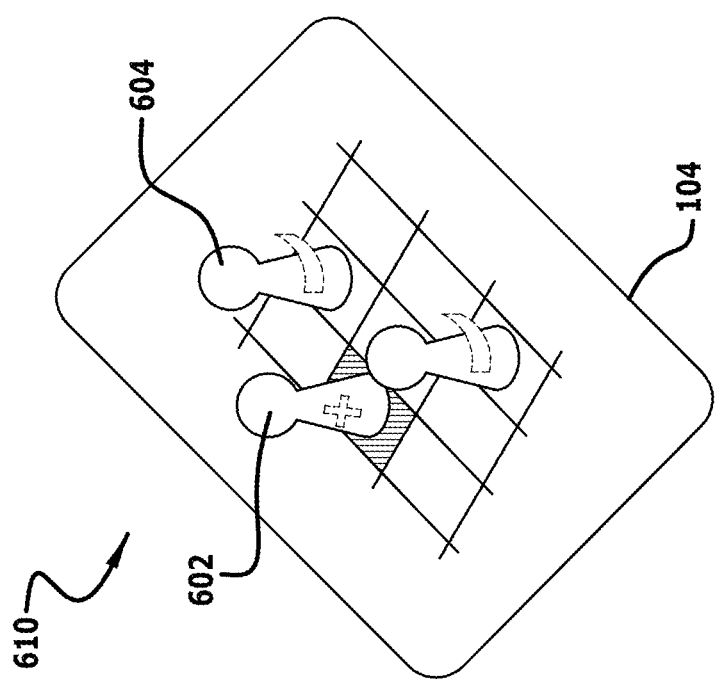

FIG. 6 shows an embodiment of the AR game system 100 that illustrates auto-selection of game pieces and adding special abilities/actions. In some embodiments of the AR game, when a game piece 604 is damaged, it can be healed by another game piece 602 that is auto-selected by the computing device 104 as shown at 610. The game piece 604 can be damaged due to an opponent's action, game rules 232 or combinations thereof. In some embodiments, the damage can be virtual wherein the game piece 604 remains inoperable even when there is no physical change. In some embodiments, the damage can be real wherein separable portions of the game piece 604 have fallen away due to a separation instruction received from the gaming device 104. When the game piece 602 is selected for healing, it can cause an image animation to execute on the display screen 122 as shown at 620 and the damaged piece 604 is re-activated by the game rules 232. In addition, if the damage is physical, the user 106 can also be instructed to affix the detached portions back to the main body of the game piece 604.

It may be appreciated that the special ability such as healing is described herein only by way of illustration and not limitation and that other special abilities like assisting with physical help or advice, communication and the like associated with any of the physical game pieces 112, 114, 116 or other virtual elements of a game can be provided. In some embodiments, the special abilities can be simulated in the AR world. In some embodiments, certain parts of the game pieces 112, 114, 116 can be physically actuated as a special ability. In some elements, the special abilities can be provided by the game or as a reward (or penalty) for an achievement or action in the game. In some embodiments, the special abilities can be selected by the user 106 from finite options presented on the display screen 122 in accordance with the game rules 232. The options for adding special abilities to the physical/virtual game pieces can be provided to the user 106 as in-game purchase, as a reward for achieving certain performance levels, or even as a limited preview for future purchase.

Figure 7:
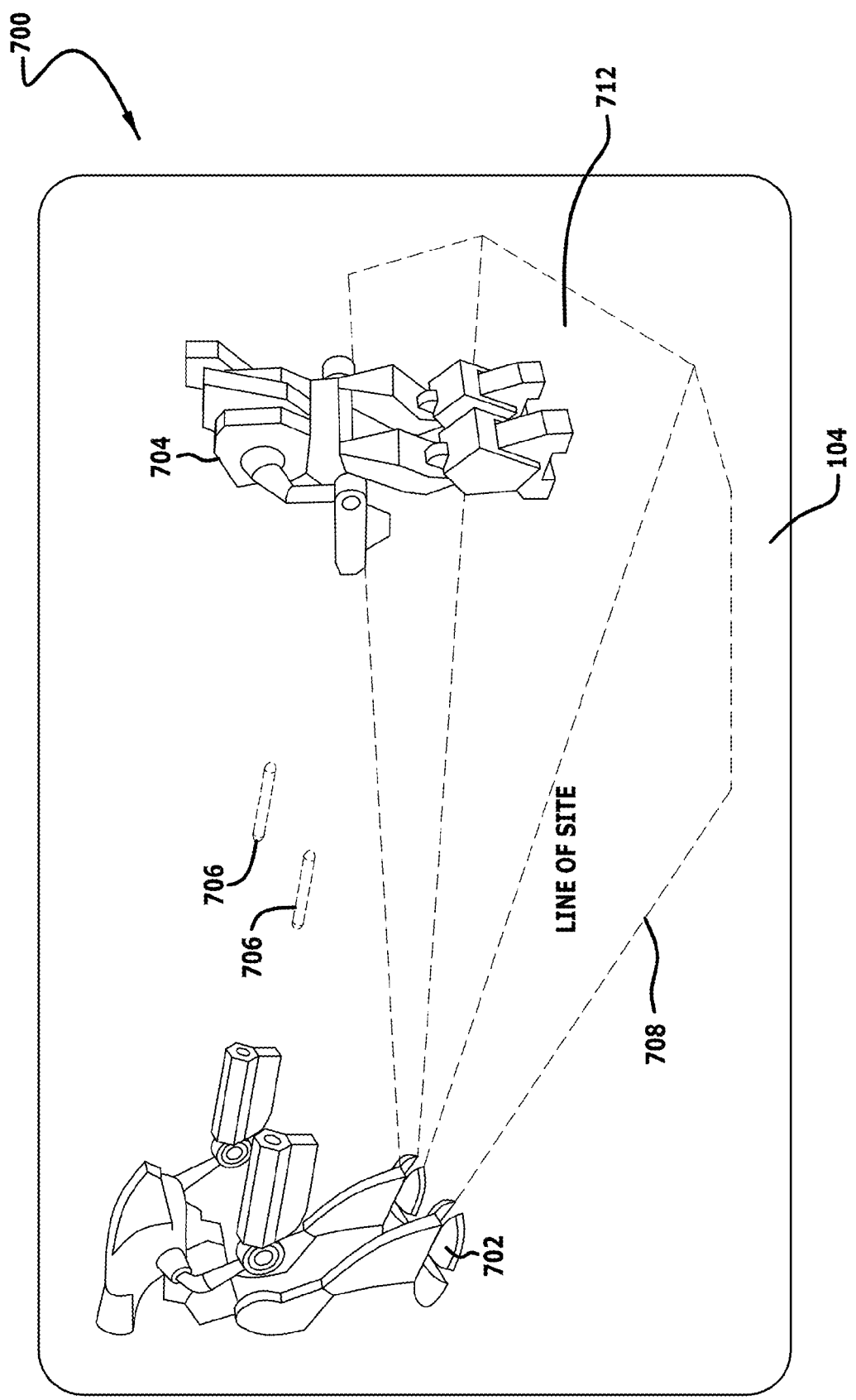
FIG. 7 is an illustration that depicts the occurrence of an AR event in accordance with some embodiments.

FIG. 7 is an illustration 700 that depicts the occurrence of an AR event in accordance with some embodiments. The computing device 104 is focused on a real toy figurine 702 which is augmented or overlaid with virtual controls indicative of its line of sight 708 and range 712 of its virtual weapons 706. In some embodiments, the opponent 704 can be a real toy figurine located geographically proximate, for example, on the same mat (not shown) as the toy figurine 702. In some embodiments, the opponent 704 can be a virtual image of another toy figurine that is at a geographically remote location from the toy figurine 702. When the virtual weapons 706 are fired by the toy figurine 702, it can have one or more of a virtual or real impact on the toy figurine 704 regardless of its geographic location in accordance with the game rules 232. The firing can be accompanied with special effects that include sudden lighting explosions, sound, smoke trails in the virtual world and the like. Similarly, when a missile is approaching the opponent, Doppler sound and visual effects, smoke trails and the like can be produced on the computing device of the opponent.

Figure 8:
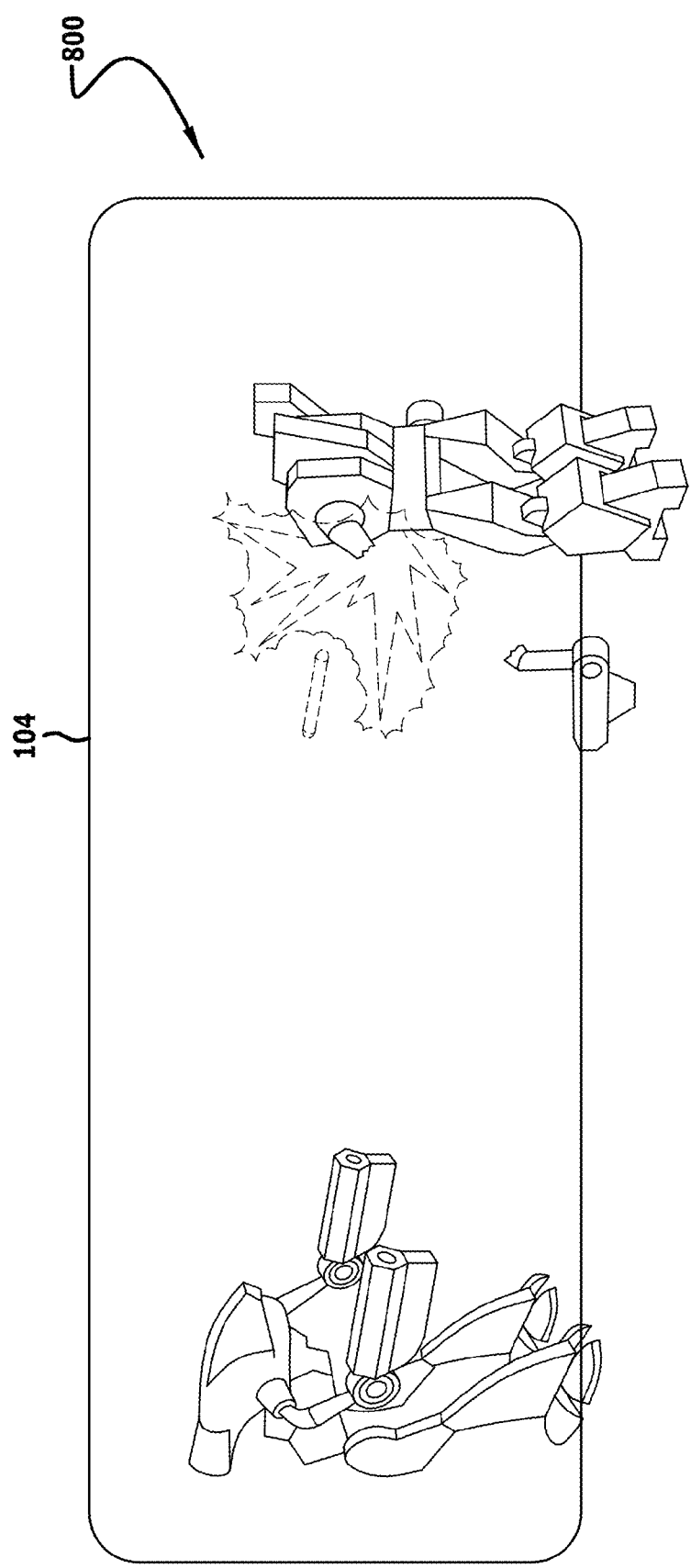
FIG. 8 is an illustration that show an AR explosion and the physical impact in accordance with embodiments described herein.

FIG. 8 is an illustration 800 that show the AR explosion and the physical impact of the virtual weapons 706 in accordance with embodiments described herein. When the virtual weapons 706 are fired, their range and point of impact can be calculated, for example, by the execution module 250 of the computing device 104 based on the game rules 232. For example, the game rules 232 can require that the position and angle of the toy 702 firing the weapons be input into the calculation of the range and impact point. In addition, other factors such as the kind of virtual weapons 706 being fired can be considered in determining the level of impact. For less powerful weapons, the impact can occur only in the virtual world whereas a real world impact can be observed for more powerful weapons such as those shown in FIG. 7. Thus, based on the calculations of range, point of impact and power of the weapons, the computing device 104 can transmit a signal directly or to another computing device in or proximate the toy (not shown) controlling the toy figurine 704 to send a separation instruction. For example, the signal from the computing device 104 can be transmitted to the other computing device via Bluetooth or WiFi. In some embodiments such as those wherein both the toy figurines 702, 704 are located in geographic proximity, the computing device 104 will be controlling both the figurines 702 and 704. Hence the separation instruction to the toy figurine 704 will be transmitted by the computing device 104 only. Although the description herein refers to weapons 706 as purely virtual, it can be appreciated that the weapons 706 can be toy missiles fired by the toy figurine 702 via actuation of some physical/AR controls by the user 106.

Figure 9:
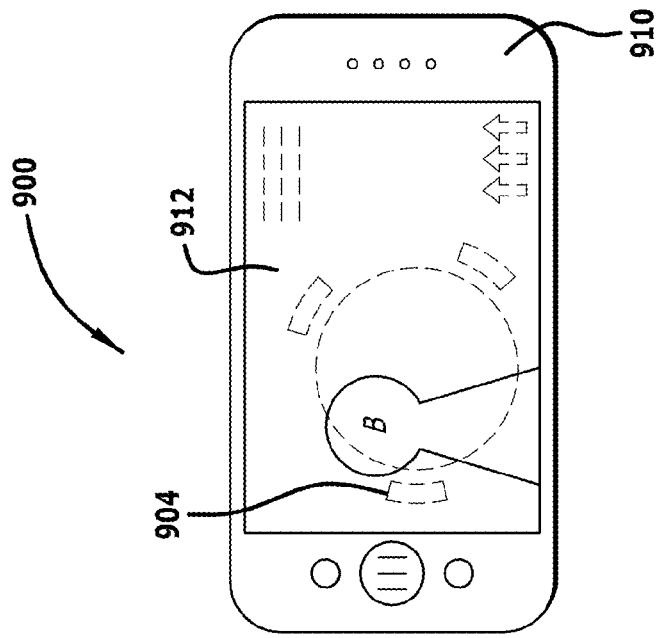
FIG. 9 is an illustration that shows an embodiment wherein direct user action is required for occurrence of an AR event.
Figure 9:
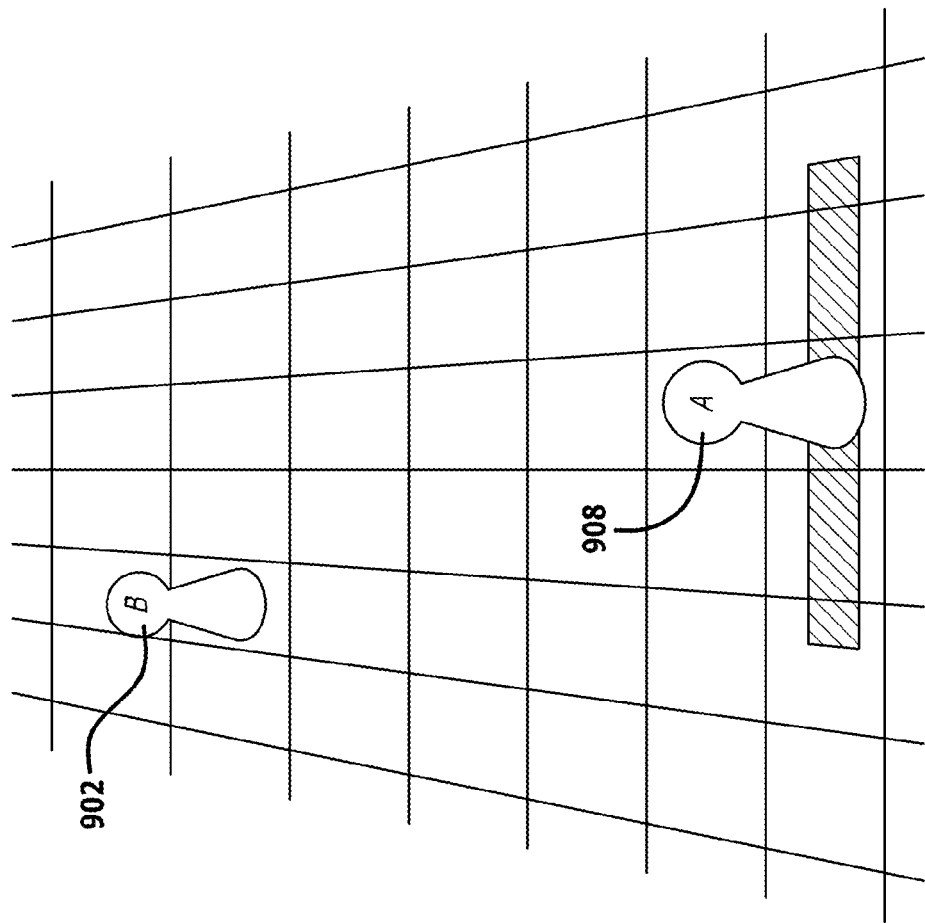

FIG. 9 is an illustration 900 that shows an embodiment wherein direct user action is required for occurrence of an AR event. The user 106 in this instance is attempting to defeat an opponent via a sniper shot. The computing device 910 is directed towards the opponent's physical game piece 902 by the user. In some embodiments, a view 912 of the field of play from the point of view (POV) of the game piece 908 is generated. The user can then execute an action, for example, a drag/drop of a virtual control 904 in order to fire an AR event. As described supra, the AR event can result in virtual and/or real impacts. Thus, embodiments of the AR game system 100 help maintain a balance between the physical and digital play.

In some embodiments, when the user 106 selects to generate a view of the game environment in the POV of the physical game piece 902, the game continues in the POV of the game piece 902 until the user 106 elects to exit the POV mode or selects another game piece for generating the POV. In the latter case, another POV view of the game environment based on the selected other game piece can be generated. It may be appreciated that in some embodiments, selection of game pieces for generating the POV views can be restricted based on the game rules. By the way of illustration and not limitation, POVs can only be generated for the user 106 for his/her own game pieces and not opponents game pieces in some embodiments. In some embodiments, multiple players involved in a game can be playing in their respective POV modes. Thus, any events that occur in the game can be viewed on their respective devices based on the POV of their selected game piece. Furthermore, the result of events that occur in the POV mode can still be viewable when the user 106 switches back to the third person mode. For example, if a tree which collapsed in response to some game event may not have been viewable to the user 106 in the POV 912 mode. However, it can be viewable when the user 106 switches to the third person mode.

In some embodiments, two views of the gaming environment can be generated and shown for example, via a split screen mode. The views can be one or more of POV views associated with the game pieces, third person views or combinations thereof. In some embodiments, the display module 240 can be further configured with programming logic to automatically switch the POV based, for example, on the distance of the computing device 104 from particular game pieces. In such embodiments, such options can be selected by the user 106 during the game set up. When the user 106 selects such options, the distance of the computing device 104 from the game pieces is monitored and when the computing device 104 is within a threshold distance of the physical game piece 902, a view of the gaming environment in the point of view of the game piece 902 can be automatically generated.

Figure 10:
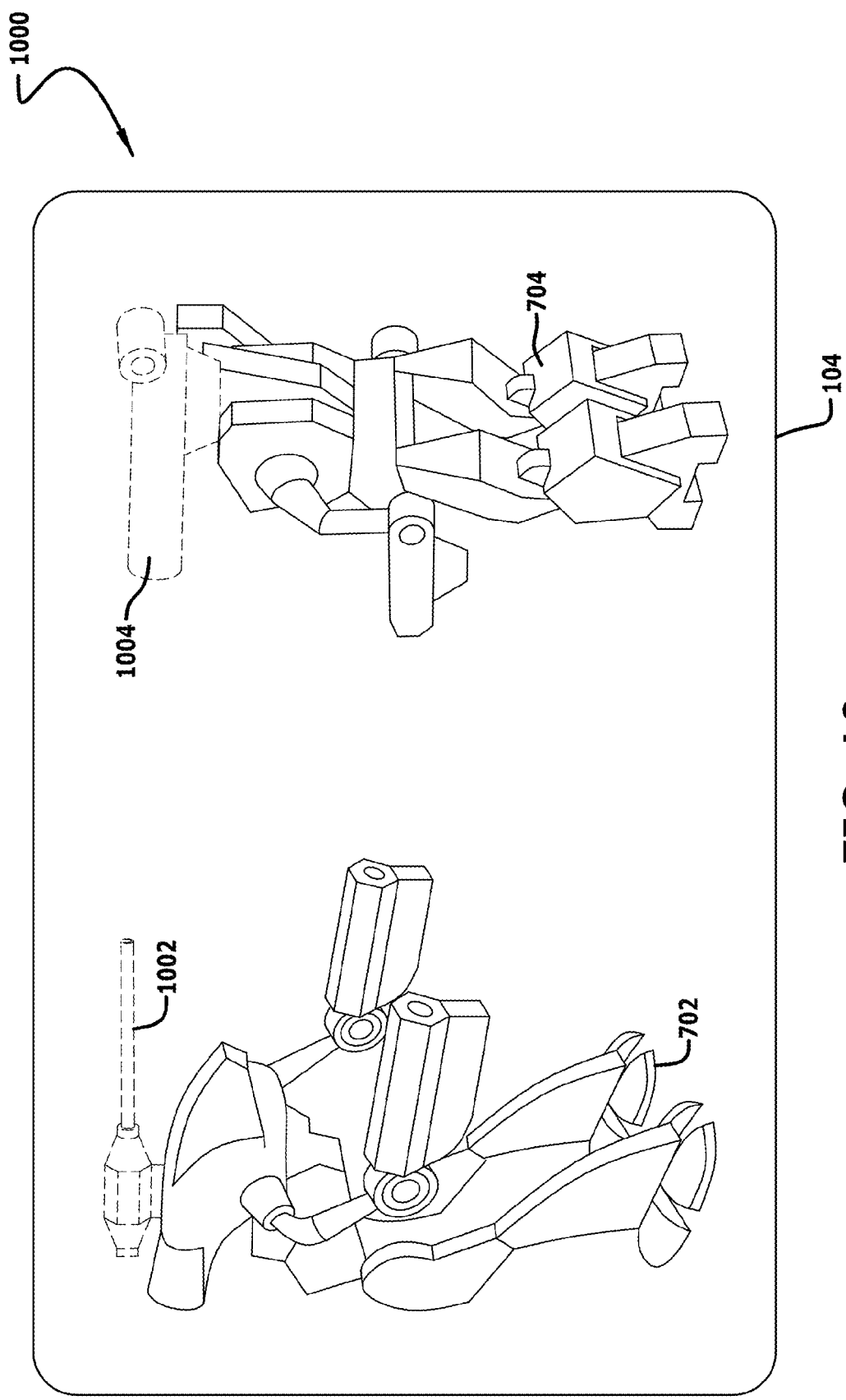
FIG. 10 is a display that shows digital enhancements to the two real toy figurines.

FIG. 10 is a display 1000 that shows digital enhancements to the two real toy figurines 702, 704. In some embodiments, with the progress of game play, the user 106 can be provided with an opportunity for in-game upgrades. Thus, when the user's 106 game piece faces a particularly formidable enemy, the game rules 232 provide the user 106 to access a virtual upgrade for the toy figurine for a price via an e-commerce site or in-app purchase or other payment mechanism, or earned for achieving a certain move or proficiency level in the game, in exchange for viewing an advertisement, or accepting branding on game pieces, or other monetization options. In an embodiment, the virtual upgrade can be additional tools or powers. In an embodiment, the virtual upgrade can comprise additional weapons. In FIG. 10, the toy figurine 702 is augmented with an additional weapon "rail gun" 1002. Similarly, the toy figurine 704 has also received an additional weapon "shoulder launcher" in a virtual upgrade. In some embodiments, the additional tools received in virtual upgrades can be available for limited time/turns after which they will no longer be available to the user 106. The user 106 may need to pay additional fee in order to continue access to the virtual tools. As the game ecosystem evolves new tools/upgrades may become available to the user 106 for purchase. Again, it may be appreciated that although virtual upgrades are illustrated as new tools/weapons herein, this is not necessary. New AR environmental elements, virtual characters, terrains, field of play objects and the like can all be available for virtual upgrades. Again, as discussed supra, although 702, 704 are depicted as being in the same location and controlled by the computing device 104, this is not necessary. The toy figurines 702, 704 can be in geographically remote locations and communicating through two different computing devices via the Internet to generate virtual events that have virtual/real world impact at either of the locations.

Figure 11:
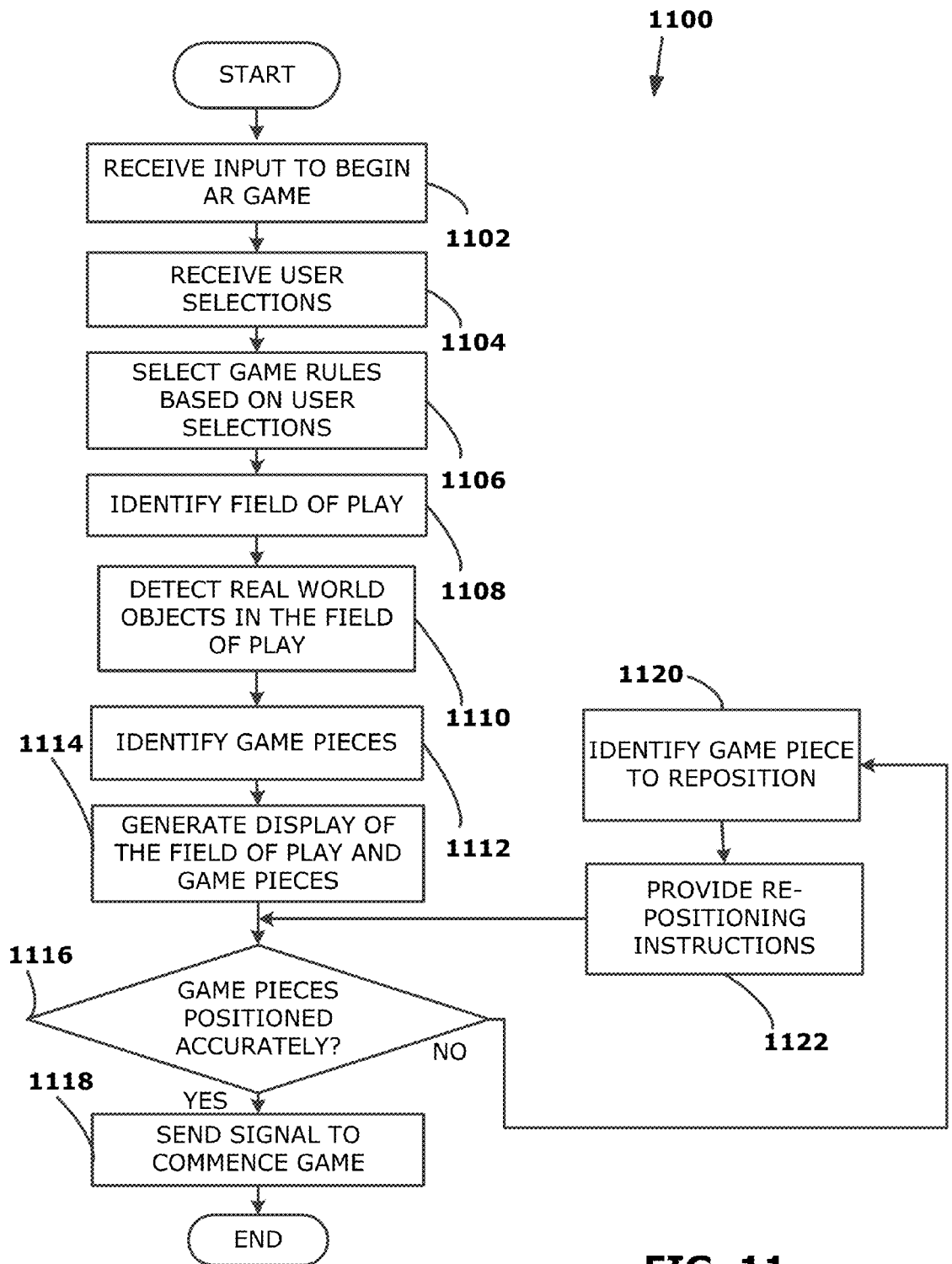
FIG. 11 is a flowchart that details a methodology of the game set up as executed by the computing device in accordance with some embodiments described herein.

FIG. 11 is a flowchart 1100 that details a methodology of the game set up as executed by the computing device 114 in accordance with some embodiments described herein. The method begins at 1102 wherein an input that convey's the user's 116 desire to begin an AR game is received. At 1104, various user selections related to the game, the AR terrain for the game, game modes and the like are received. The game rules 232 are selected at 1106 based at least on the user selections received at 1104. The field of play 112 is identified at 1108 and the real world objects 112, 114, 116, 118, 120 within the field of play 102 are detected at 1110. The game pieces 112, 114 and 116 are identified at 1112. For example, all the game pieces 112, 114, 116 can be identified as associated with a single group or army or based on user selections at 1104, different pieces may need to belong to different groups. Thus, the identification of game pieces at 1112 can affect their appearance in the AR game display.

Based on the received user selections and game rules a display of the field of play with the augmented game pieces is generated at 1114. At 1116 it is determined if the game pieces 112, 114, 116 are positioned within the field of play 102 in accordance with the game rules 232. As described supra, the positions can be determined via 3D object recognition techniques, 2 dimensional markers on the game pieces, RFID, position calculations from view obtained using the camera, IR designs on the mat 132 and similar techniques. In some embodiments, based on the extent of the field of play, the relative positions of the various game pieces may be coded into the AR game and the current positions of the game pieces 112, 114, 116 can be compared with such pre-coded positions in order to make the determination at 1116. If yes, the user 106 is signaled at 1118 that the game can be commenced and the method terminates on the end block. Else, the game piece that needs to be re-positioned in order to comply with the game rules is identified at 1120, an instruction regarding the direction and the extent to which the game piece(s) needs to be moved is provided at 1122 and the method returns to 1116 to determine if the game piece has been position accurately.

Figure 12:
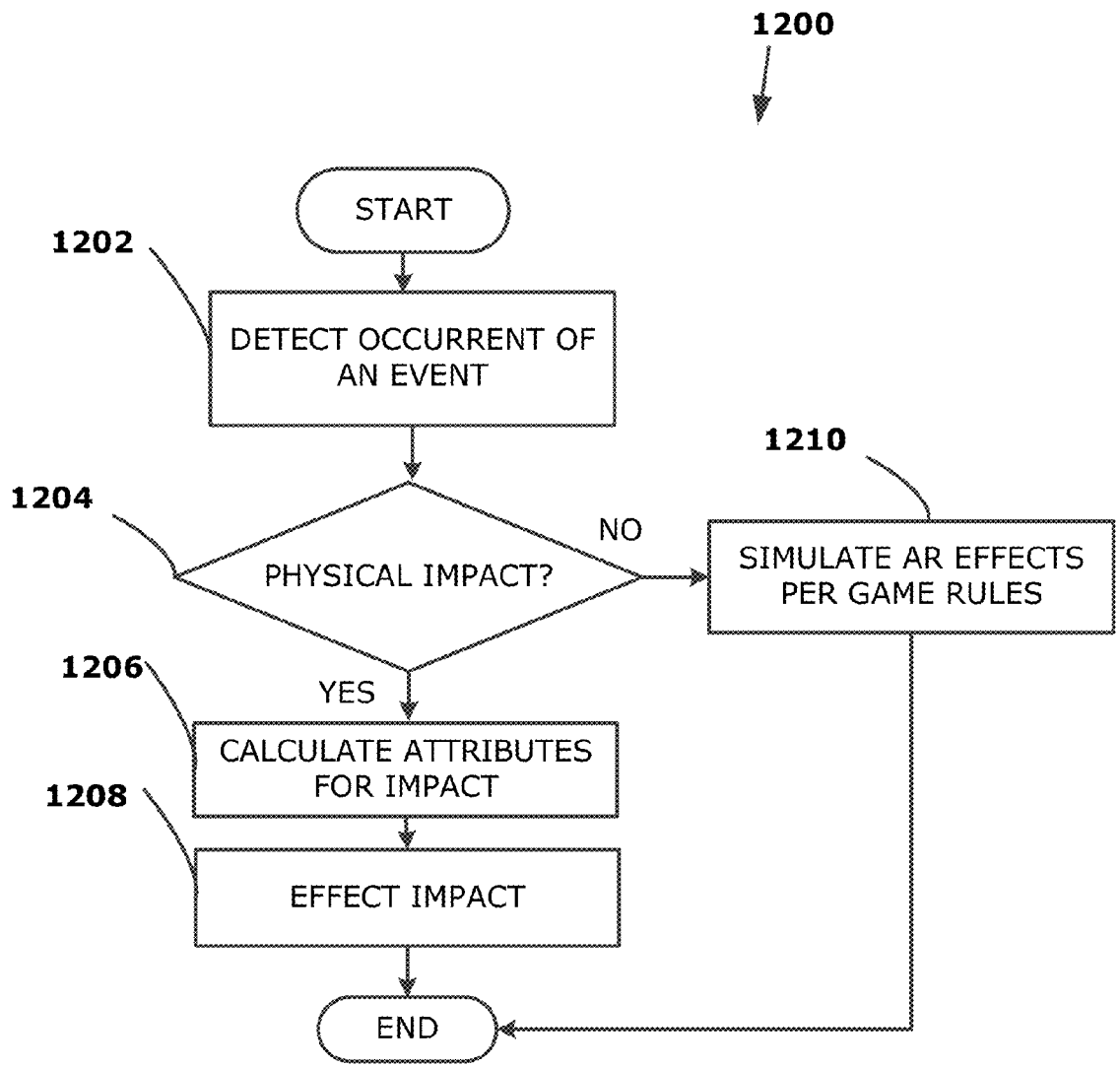
FIG. 12 is a flowchart the details a methodology of generating an impact of an event in accordance with some embodiments.

FIG. 12 is a flowchart 1200 the details a methodology of generating an impact of an event in accordance with some embodiments. The method commences at 1202 wherein the occurrence of an event is detected. Various AR and real-world events can occur in a game which can include but are not limited to events that occur due to user actions or events that can be fired by the AR game rules. Events that occur due to user actions can comprise the user 106 activating an AR control to change the position of a game piece or activate a weapon. Events that are automatically fired by the game rules 232 can include but are not limited to an automatic instruction from the computing device 104 to one or more of the game pieces 112, 114, 116 to slow down movement or stop while moving due to for example, AR obstacles in their path. Moreover, some events can have both virtual impact and impact in the real world. It is therefore determined at 1204 if the event that occurred at 1202 has a physical impact.

If it has no physical impact, its virtual effects are simulated by the computing device 104 at 1210 and the method terminates on the end block. If it has a physical impact, the parameters of the physical impact are calculated at 1206. For example, if the event is activation of a virtual control for movement of a game piece by the user 106, the direction, speed and distance associated with motion of the game piece is calculated at 1206. Similarly, if a virtual missile is fired, the speed at which it flies, distance of its flight and the point of impact is calculated at 1206. If an automatic AR event to slow down a game piece is fired at 1202, then the extent to which a game piece needs to slow down is calculated at 1206. Thus, the parameters calculated at 1206 are based on the type of effects the events have.

Upon calculation of the parameters, the physical change is effected at 1208. Effecting a physical change can comprise moving a vehicular game piece 112 by a predetermined distance or sending instructions to a game piece which instructions can include but are not limited to separation instruction, instruction to slow down, instruction to generate sound/light effects and the like. It can be appreciated that all the steps of the process 1200 need not be executed by a single computing device. For example, if the missile is fired by the computing device 104 of the user 106 at a game piece controlled by another computing device, then such event is transmitted by the computing device 104 to the other computing device via networks such as Bluetooth, WiFi or the Internet. In this case, the steps of determining/calculating the physical impact parameters and effecting the physical change can be carried out by the other computing device in accordance with some embodiments.

Figure 13:
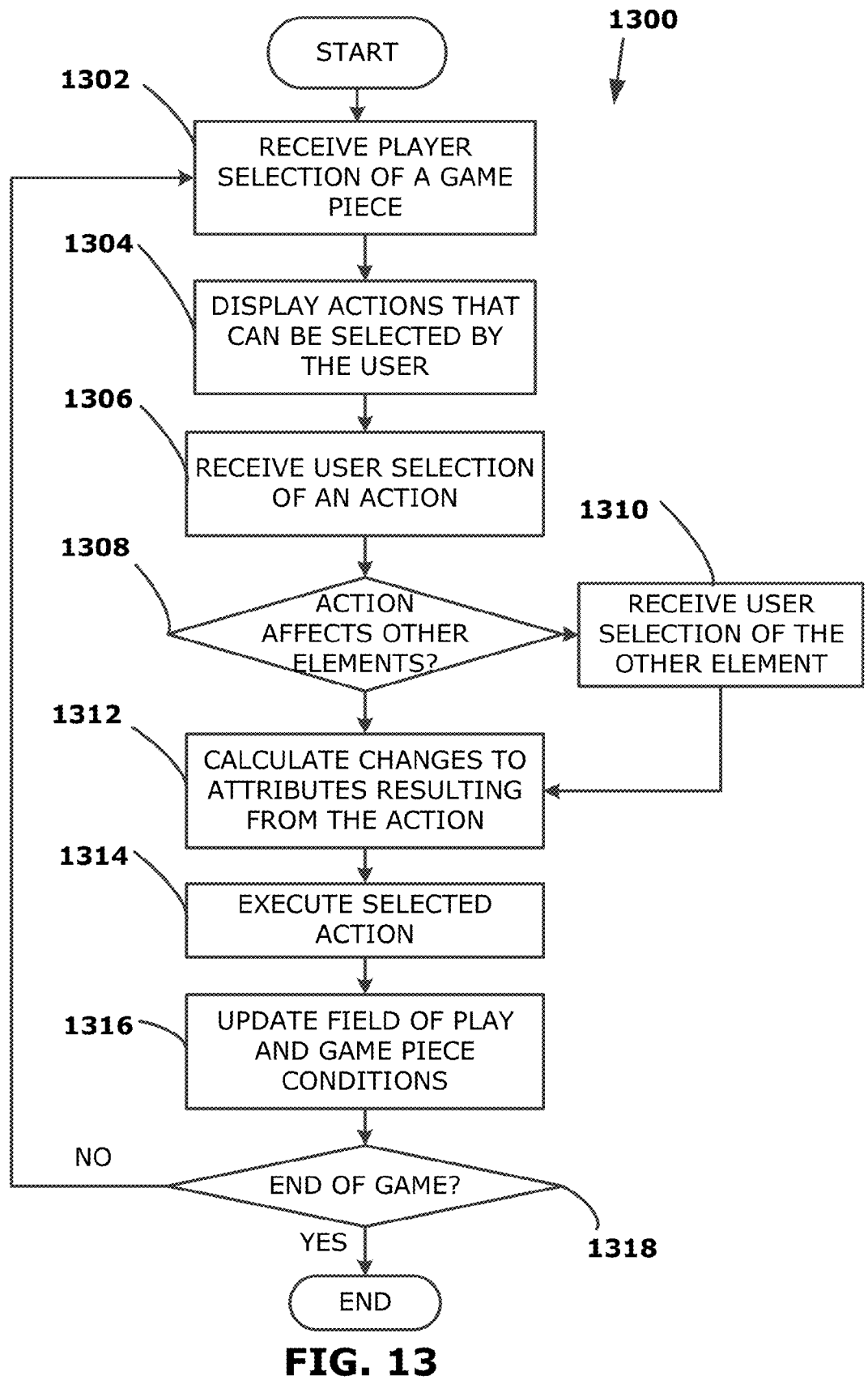
FIG. 13 is a flowchart that details the game play in accordance with some embodiments.

FIG. 13 is a flowchart 1300 that details the game play in accordance with some embodiments. The method begins at 1302 wherein the user's 106 selection of one of the user's own game pieces for playing a turn is received. At 1304, the various actions that can be effectuated by the user 106 via the game piece 112 are displayed to the user 104 on the display screen 122. The actions associated with the selected game piece 112 can vary based on the game rules 232 and current game conditions. The actions displayed at 1304 can affect the same game piece or they can affect multiple game pieces. By the way of illustration and not limitation, action such as moving the selected game piece 112 from one position to another generally does not affect other game pieces. However, other actions such as attacking an opponent's game pieces are possible in war games in which case other game pieces are affected. Moreover, for the same game piece 112, the actions presented to the user 106 at 1304 can depend on various factors such as but not limited to, the game being played, the level of progress in the game, the sophistication of the player 106, the in-game options that the user 106 has earned or purchased and the role of the game piece 112 in the game. At 1306, the user selection of one of the actions is received.

At 1308 it is determined if the user selected action necessitates selection of another game element. For example, the user 106 can select to interact with another game element. The interaction can comprise without limitation, attacking an opponent's game piece or destroying an obstacle comprising a field of play objects 118, 120 or special actions such as healing or communication. If is it determined at 1308 that the user selected to interact with another game element, the user's selection of the other game element is received at 1310 and the attribute changes resulting from the user selected action are calculated at 1312. If it is determined at 1308 that the action selected at 1306 does not involve another game element, the method proceeds directly to 1312 wherein the attribute changes resulting from the user selected action are calculated.

In some embodiments, if the user has selected to move the game piece 112 has to a new destination, the position of the game piece 112 in the field of play 102, the various views of the field of play 102, any other attributes such as appearance of the game piece 112 that may have changed due to the move need to be determined at 1312. At 1314 the user's selected action is executed. Thus, at 1314 changes such as but not limited to the game piece 112 being moved to a new position, firing a virtual control associated with the game piece 112 to affect another game element or changes resulting from activation of a special ability are effectuated.

The field of play conditions and the attributes that changed due to the action at 1314 are updated at 1316. The updates at 1316 may or may not be visible to the user 106. Such updates can include but are not limited to, any changes to the appearance of the game piece(s) and/or field of play 102, a refreshed view of the field of play 102 or a recordation of the attribute of an affected game piece which may not be immediately visible to the user or selection of further game rules in response to the executed action. At 1318, it is determined if the game has ended. If yes, the process terminates on the end block, else it returns to 1302 to await the next selection from the user 106.

Figure 14:
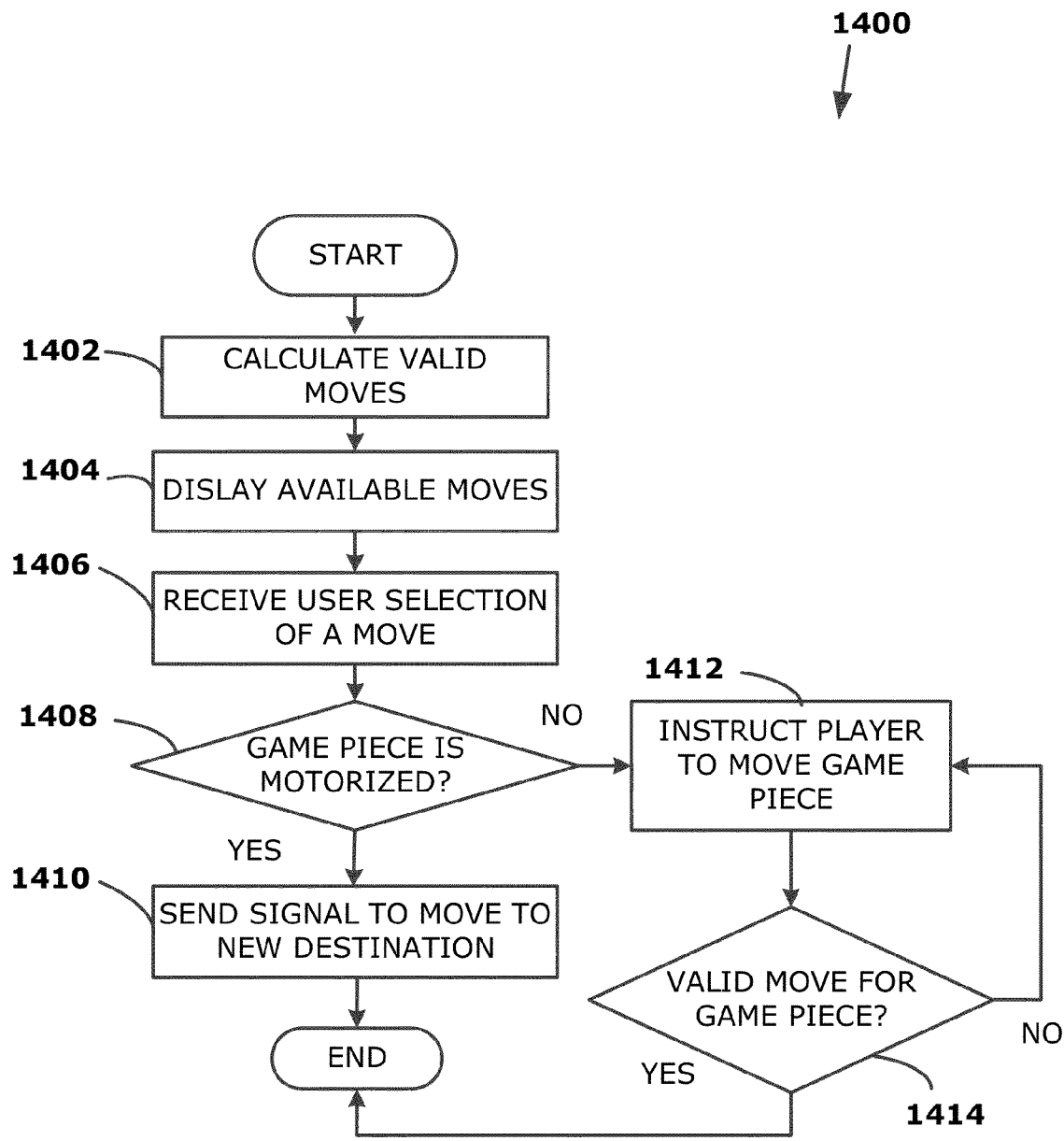
FIG. 14 is a flowchart that details execution of the user selected action for a game piece in accordance with some embodiments.

In some embodiments, the user 106 can select an action that affects the same game piece selected for playing the turn and wherein the action does not affect other game pieces. By the way of illustration and not limitation, moving the selected game piece 112 from one position to another within the field of play 102 is an action that does not affect other game pieces. FIG. 14 is a flowchart 1400 that details execution of the user selected action for a game piece which does not affect other game pieces in accordance with some embodiments. The method begins at 1402 wherein the valid moves or permitted paths or destinations are calculated based on the game rules and the current game conditions.

For example, there may be multiple moves permitted for the selected game piece 112 based on the nature of the game or the movement of the game piece 112 may be restricted due to a game condition, such as presence of a physical or virtual obstacle. The valid moves affecting the selected game piece 112 thus derived and available for further user selection are shown on the display screen 122 at 1404. The user selection of one of the moves for the game piece 112 is received at 1406. At 1408, it is determined if the game piece 112 is motorized. As described supra, the physical game pieces can be motorized to facilitate independent motion based on the signals from the computing device 104 or they may not be motorized in which case they need to be moved by the user 106 by hand. If it is determined at 1408 that the game piece 112 is motorized, a signal is transmitted by the computing device 104 at 1410 to move the game piece to the user-selected destination and the process terminates. If it is determined at 1408 that the game piece is not motorized, the user 106 is instructed to move the game piece 112 to the selected destination at 1412. In some embodiments, the destination can be indicated to the user 106 via visible insignia on the display screen 122. At 1414, it is determined of the piece was moved to the selected/valid destination. If it is determined at 1414 that the game piece 112 was moved to an invalid destination, the process returns to 1412 wherein the user 106 is instructed to move the game piece 112 to the indicated destination. If at 1414, it is determined if the game piece 112 was moved to the selected/valid destination the process terminates on the end block.

Figure 15:
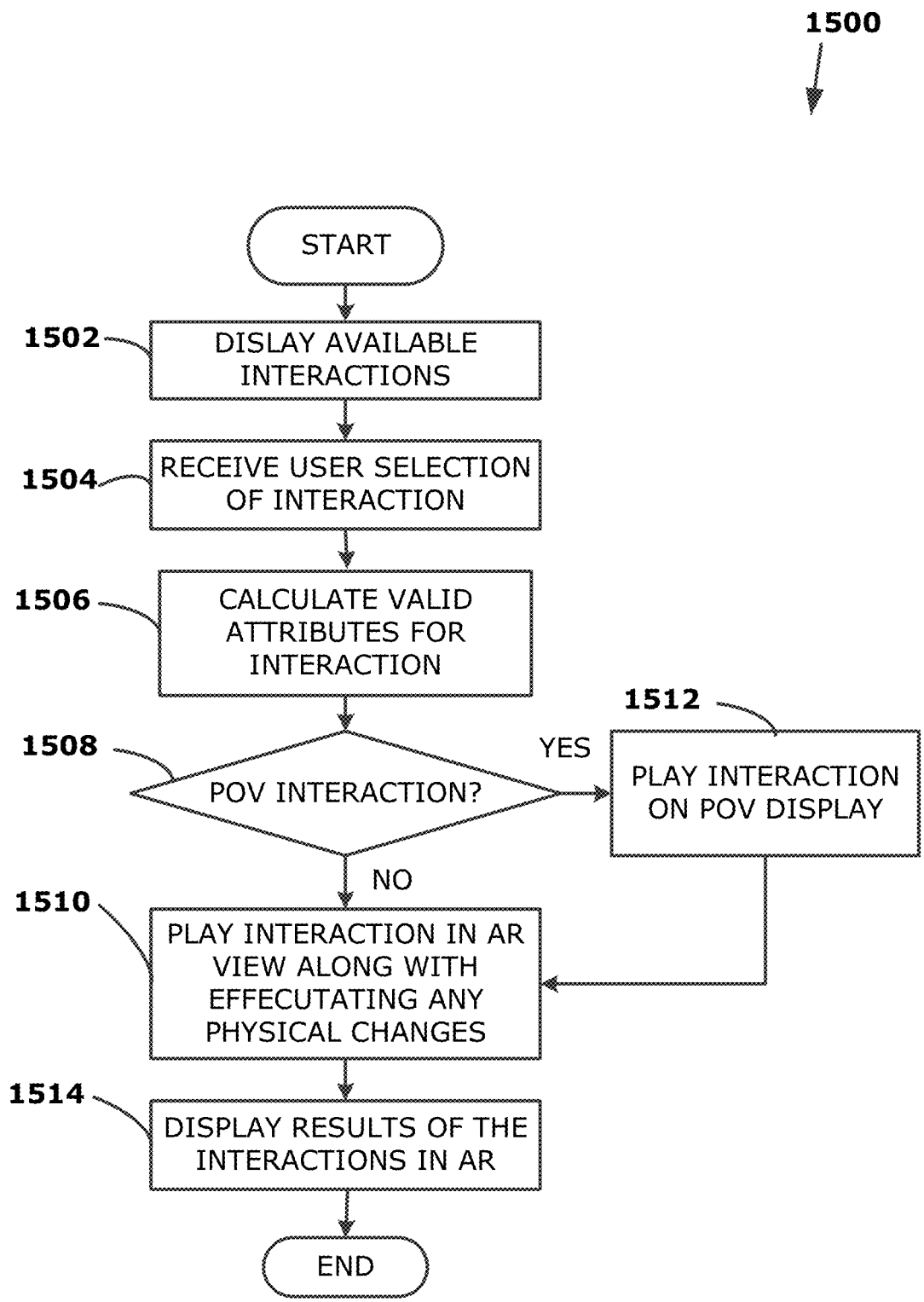
FIG. 15 is a flowchart details execution of the user selected action for a game piece that affects other game pieces in accordance with some embodiments.

FIG. 15 is a flowchart 1500 details execution of the user selected action for a game piece that affects other game pieces in accordance with some embodiments. The method begins at 1502 wherein available interactions between the game piece 112 and the selected game element are displayed. At 1504, the interaction selected by the user 106 is received. At 1506, the attributes associated with the user selected interaction are calculated. The attributes can be calculated based on but not limited to the game rules, nature of the game elements selected for interaction, position of the game elements, any tools (such as weapons) of the interaction. At 1508, it is determined if the user 106 is in the POV mode. If yes, the interaction between the selected game piece 112 and the other game elements is carried out in the POV mode as shown at 1512. The user 106 therefore views the interaction in the POV mode. Similarly, if another user is viewing the interaction from his/her respective computing device then the interaction may or may not be seen by the other user based on their view of the field of play 102. Thus, if the other user is viewing the field of play 102 in a POV mode associated with a game piece, the interaction is viewable based on the view of the game piece associated with the POV. If at 1508, it is determined that the user 106 is viewing the field of play 102 in a third-person mode or AR mode, a full view of the field of play 102 along with the interaction is shown to the user 106 on the display screen at 1510. In addition, any physical changes resulting from the interaction are effectuated at 1510. If another user is viewing the interaction in an AR view, the interaction can be viewed by the other user. In some embodiments, if the user 106 or the other user switches from the POV mode to the AR or third-person mode after the interaction, then the physical changes at 1510 will be viewed by them at 1514.

Figure 16:
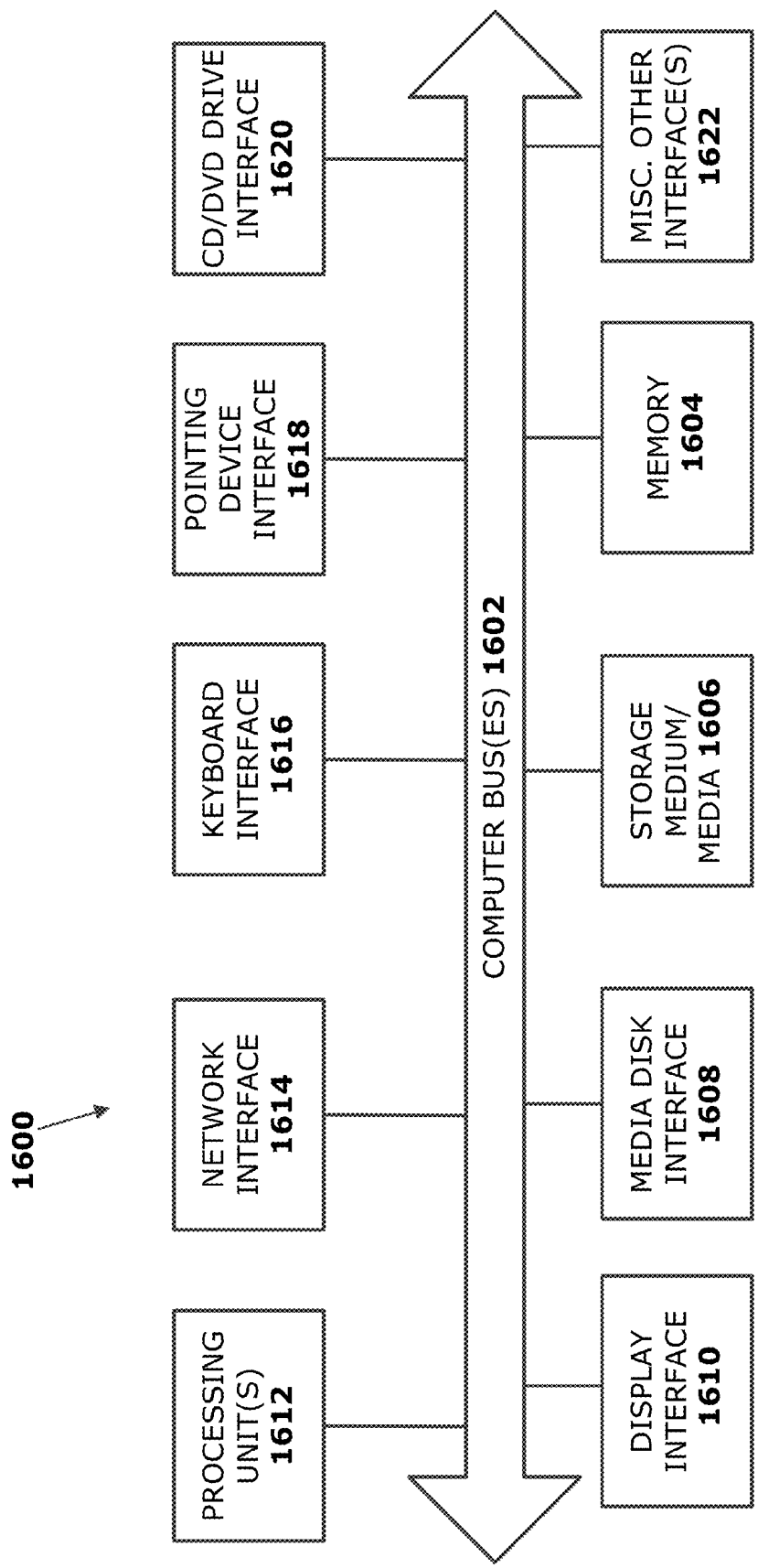
FIG. 16 illustrates the internal architecture of a computing device in accordance with embodiments described herein.

As shown in the example of FIG. 16, internal architecture of a computing device 1600 includes one or more processing units (also referred to herein as CPUs) 1612, which interface with at least one computer bus 1602. Also interfacing with computer bus 1602 are persistent storage medium/media 1606, network interface 1614, memory 1604, e.g., random access memory (RAM), run-time transient memory, read only memory (ROM), etc., media disk drive interface 1608, an interface 1620 for a drive that can read and/or write to media including removable media such as floppy, CD-ROM, DVD, etc., media, display interface 1610 as interface for a monitor or other display device, keyboard interface 1616 as interface for a keyboard, pointing device interface 1618 as an interface for a mouse or other pointing device, and miscellaneous other interfaces 1622 not shown individually, such as parallel and serial port interfaces, a universal serial bus (USB) interface, and the like.

Memory 1604 interfaces with computer bus 1602 so as to provide information stored in memory 1604 to CPU 1612 during execution of software programs such as an operating system, application programs, device drivers, and software modules that comprise program code or logic, and/or computer-executable process steps, incorporating functionality described herein, e.g., one or more of process flows described herein. CPU 1612 first loads computer-executable process steps or logic from storage, e.g., memory 1604, storage medium/media 1606, removable media drive, and/or other storage device. CPU 1612 can then execute the stored process steps in order to execute the loaded computer-executable process steps. Stored data, e.g., data stored by a storage device, can be accessed by CPU 1612 during the execution of computer-executable process steps.

Persistent storage medium/media 1606 is a computer readable storage medium(s) that can be used to store software and data, e.g., an operating system and one or more application programs. Persistent storage medium/media 1606 can also be used to store device drivers, such as one or more of a digital camera driver, monitor driver, printer driver, scanner driver, or other device drivers, web pages, content files, metadata, playlists and other files. Persistent storage medium/media 1606 can further include program modules/program logic in accordance with embodiments described herein and data files used to implement one or more embodiments of the present disclosure.

FIG. 17 is a schematic diagram illustrating a client device implementation of a computing device in accordance with embodiments of the present disclosure. A client device 1700 may include a computing device capable of sending or receiving signals, such as via a wired or a wireless network, and capable of running application software or "apps" 1710. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device or a user device can include standard components such as a CPU 1702, power supply 1728, a memory 1718, ROM 1720, BIOS 1722, network interface(s) 1730, audio interface 1732, display 1734, keypad 1736, illuminator 1738, I/O interface 1740 interconnected via circuitry 1726. Claimed subject matter is intended to cover a wide range of potential variations. For example, the keypad 1736 of a cell phone may include a numeric keypad or a display 1734 of limited functionality, such as a monochrome liquid crystal display (LCD) for displaying text. In contrast, however, as another example, a web-enabled client device 1700 may include one or more physical or virtual keyboards 1736, mass storage, one or more accelerometers, one or more gyroscopes, global positioning system (GPS) 1724 or other location identifying type capability, Haptic interface 1742, or a display with a high degree of functionality, such as a touch-sensitive color 2D or 3D display, for example. The memory 1718 can include Random Access Memory 1704 including an area for data storage 1708.

A client device 1700 may include or may execute a variety of operating systems 1706, including a personal computer operating system, such as a Windows, iOS or Linux, or a mobile operating system, such as iOS, Android, or Windows Mobile, or the like. A client device 1700 may include or may execute a variety of possible applications 1710, such as a client software application 1714 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1700 may also include or execute an application to communicate content, such as, for example, textual content, multimedia content, or the like. A client device 1700 may also include or execute applications 1714 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   identifying, by a processor of a computing device, a field of play for placement of a plurality of physical objects;
   identifying, by the processor, physical game pieces among the plurality of physical objects placed within the field of play so as to differentiate between the game pieces and the field of play objects;
   visibly displaying, by the processor on a display screen of the computing device, the field of play as a terrain for an AR (Augmented Reality) game, wherein each of the field of play objects is displayed with a virtual appearance that differs from an appearance of the field of play object in the real world;
   determining, by the processor, if placements of the plurality of physical objects comport with game rules;
   providing feedback, by the processor, to a user of the computing device if the placements do not comport with the game rules; and
   signaling, by the processor, to the user that the AR game may be commenced upon sensing that the placement of the plurality of physical objects comports with the game rules.

2. The method of claim 1, further comprising:
   augmenting, by the processor, an image of at least one of the physical game pieces shown on the display screen with at least one additional virtual control; and
   receiving, by the processor, user input to activate the additional virtual control.

3. The method of claim 2, wherein the activation of the additional virtual control causes a physical change to the at least one physical game piece.

4. The method of claim 3, wherein the physical change comprises change in position of the at least one physical object from a first position to a second position, wherein the second position is in compliance with the game rules.

5. The method of claim 2, further comprising:
   displaying, by the processor, a graphic animation upon the activation of the additional virtual control; and
   causing, by the processor, a physical change to another one the physical game pieces.

6. The method of claim 5, wherein the other physical game piece is located in a geographic location that is remote from a geographic location of the at least one physical game piece.

7. The method of claim 1 further comprising:
   displaying, by the processor, an unknown object as an element of the terrain in the AR game when at least one of the physical objects placed in the field of play is an unknown object.

8. The method of claim 7, further comprising:
   instructing the user, by the processor, to replace the unknown object if the unknown object does not comport with the game rules.

9. The method of claim 8, wherein an image of the unknown object is unchanged if the unknown object does not comport with the game rules.

10. The method of claim 1, wherein the physical game pieces are known to the processor via respective identifiers.

11. The method of claim 10, further comprising:
    receiving, by the processor, a signal from an new game piece for identification and inclusion within the field of play.

12. The method of claim 11, further comprising:

registering, by the processor, a respective identifier of the new game piece; and displaying, by the processor, an augmented image of the new game piece within the terrain of the AR game.

13. The method of claim 1, further comprising:

providing, by the processor, a plurality of options related to the AR game for user selection;

receiving, by the processor, the user selection of one of the plurality of options; and overlaying, by the processor, the terrain associated with the user selected option on the field of play.

14. The method of claim 1, further comprising:

receiving, by the processor, a user selection of one of the physical game pieces for generation of a point of view display;

generating, by the processor, the point of view display of the terrain presenting positions of the physical game pieces in the field of play based on a perspective of the selected physical game piece; and displaying, by the processor, the point of view display on a screen of the computing device.

15. The method of claim 1, further comprising:

transmitting, by the processor, signal to affect an attribute of at least one of the physical game pieces at a predetermined time point in the AR game.

16. The method of claim 1, wherein the field of play is identified with respect to the placements of the game pieces on a flexible mat.

17. The method of claim 16, wherein determining, by the processor, if placements of the plurality of physical objects comport with game rules further comprises:

receiving, by another computing device comprised in the flexible mat, signals from the game pieces; and transmitting, by the other computing device, the signals received from the game pieces, to the processor.

18. An apparatus comprising:

at least one processor;

a storage medium for tangibly storing thereon program logic for execution by the processor, the program logic comprising:

field identifying logic, executed by the processor, for identifying a field of play for placement of a plurality of physical objects;

game piece identifying logic, executed by the processor, for identifying physical game pieces among the plurality of physical objects placed within the field of play so as to differentiate between the game pieces and the field of play objects;

displaying logic, executed by the processor, for visibly displaying on a display screen of the apparatus, the field of play as a terrain for an AR (Augmented Reality) game, wherein each of the field of play objects is displayed with a virtual appearance that differs from an appearance of the field of play object in the real world;

determining logic, executed by the processor, for determining if placements of the plurality of physical objects comport with game rules;

feedback logic, executed by the processor, for providing feedback to a user of the apparatus if the placements do not comport with the game rules; and signaling logic, executed by the processor, for signaling to the user that the AR game may be commenced upon sensing that the placement of the plurality of physical objects comport with the game rules.

19. The apparatus of claim 18, further comprising:

augmenting logic, executed by the processor, for augmenting an image of at least one of the physical game pieces shown on the display screen with at least one additional virtual control; and input receiving logic, executed by the processor, for receiving user input to activate the additional virtual control, wherein the activation of the additional virtual control causes a physical change to the at least one physical game piece.

20. The apparatus of claim 18, further comprising:

animation logic, executed by the processor, for displaying a graphic animation upon the activation of the additional virtual control; and change logic, executed by the processor, for causing a physical change to another one of the physical game pieces.

21. The apparatus of claim 20, further comprising:

point-of-view display generating logic, executed by the processor, for generating a point of view display of the terrain presenting positions of the physical game pieces in the field of play based on a perspective of a selected physical game piece and for displaying the point of view display on a screen of the computing device.

22. The apparatus of claim 20, further comprising:

logic for transmitting, by the processor, a signal to affect an attribute of at least one of the physical game pieces at a predetermined time point in the AR game.

23. The apparatus of claim 18, further comprising:

logic executed by the processor for displaying the unknown object as an element of the terrain in the AR game when at least one of the physical objects placed in the field of play is an unknown object.

24. The apparatus of claim 18, further comprising: instructing logic, executed by the processor, for instructing the user to replace the unknown object if the unknown object does not comport with the game rules.

* * * * *